(12) United States Patent  (10) Patent No.: US 9,140,939 B2
Lee et al.  (45) Date of Patent: Sep. 22, 2015

(54) LIQUID CRYSTAL DISPLAY AND MANUFACTURING METHOD THEREOF

(71) Applicant: Samsung Display Co., Ltd., Yongin, Gyeonggi-do (KR)

(72) Inventors: Seon Uk Lee, Seongnam-si (KR); Won Tae Kim, Yongin-si (KR); Yu Jin Kim, Yongin-si (KR); Woo Jae Lee, Yongin-si (KR); Kyung-Tae Chae, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 213 days.

(21) Appl. No.: 13/787,315

(22) Filed: Mar. 6, 2013

(65) Prior Publication Data

US 2014/0104533 A1    Apr. 17, 2014

(30) Foreign Application Priority Data

Oct. 15, 2012 (KR) ........................ 10-2012-0114226

(51) Int. Cl.
*G02F 1/1341* (2006.01)
*G02F 1/1333* (2006.01)
*G02F 1/1337* (2006.01)
*G02F 1/1362* (2006.01)
*G02F 1/1343* (2006.01)
*G02F 1/139* (2006.01)

(52) U.S. Cl.
CPC .... *G02F 1/134363* (2013.01); *G02F 1/133377* (2013.01); *G02F 1/1393* (2013.01); *G02F 1/133707* (2013.01); *G02F 1/136209* (2013.01); *G02F 2001/134345* (2013.01)

(58) Field of Classification Search
CPC ............... G02F 1/133377; G02F 1/133707; G02F 1/136209; G02F 1/1341
USPC ............. 349/158, 187–190, 156, 154; 438/30
See application file for complete search history.

(56) References Cited

U.S. PATENT DOCUMENTS

| 5,386,307 | A | * | 1/1995 | Jang ................................ 349/81 |
| 6,141,072 | A | * | 10/2000 | Drabik et al. ................. 349/122 |
| 6,469,761 | B1 | | 10/2002 | Drabik et al. |
| 7,123,319 | B2 | | 10/2006 | Broer et al. |
| 8,169,140 | B2 | | 5/2012 | Han |
| 2012/0062448 | A1 | * | 3/2012 | Kim et al. ....................... 345/55 |

FOREIGN PATENT DOCUMENTS

| JP | 2000-330130 | 11/2000 |
| KR | 1020010005935 | 1/2001 |
| KR | 1020030063656 | 7/2003 |
| KR | 1020120026880 | 3/2012 |

* cited by examiner

*Primary Examiner* — Michael Caley
*Assistant Examiner* — Jia Pan
(74) *Attorney, Agent, or Firm* — F. Chau & Associates, LLC

(57) ABSTRACT

A manufacturing method of a liquid crystal display includes forming a sacrificial layer on a liquid crystal panel, forming an etch stop layer on the sacrificial layer, forming a photo resist pattern on the etch stop layer, completing the etch stop layer using the photo resist pattern as a mask, ashing the photo resist pattern and the sacrificial layer by using the completed etch stop layer as a mask, forming a microcavity by removing a portion of the sacrificial layer and forming a liquid crystal layer in the microcavity.

9 Claims, 36 Drawing Sheets

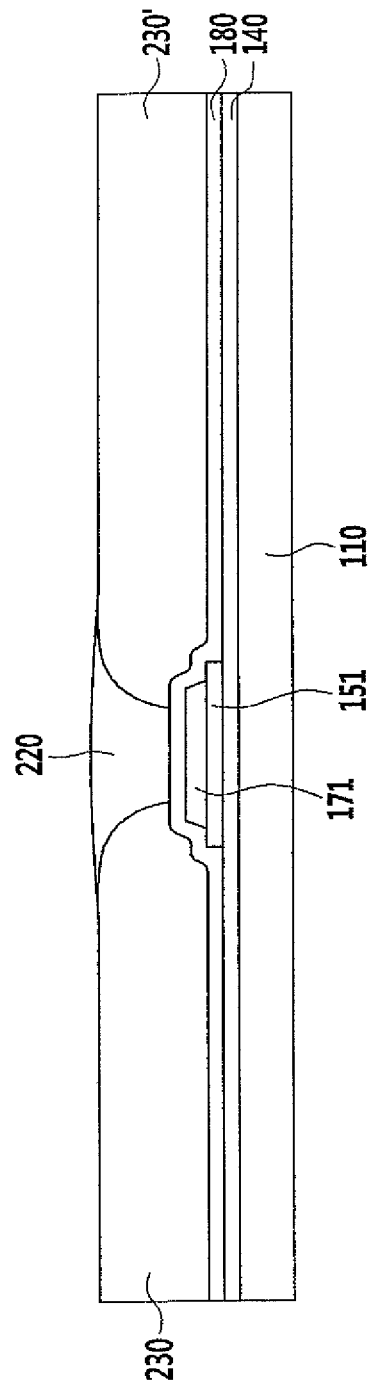

LIQUID CRYSTAL DISPLAY AND MANUFACTURING METHOD THEREOF

CROSS-REFERENCE TO RELATED APPLICATION

This application claims priority to Korean Patent Application No. 10-2012-0114226 filed on Oct. 15, 2012, the entire disclosure of which is hereby incorporated by reference herein in its entirety.

TECHNICAL FIELD

The present disclosure relates to a liquid crystal display and a manufacturing method thereof, and more particularly, to a liquid crystal display having a liquid crystal layer (nano crystal) included in a microcavity and a manufacturing method thereof.

DISCUSSION OF THE RELATED ART

A liquid crystal display which is one of the most common types of flat panel displays currently in use, includes two sheets of panels with field generating electrodes such as a pixel electrode, a common electrode, and the like and a liquid crystal layer interposed therebetween.

The liquid crystal display generates an electric field in the liquid crystal layer by applying voltage to the field generating electrodes, and determines the direction of liquid crystal molecules of the liquid crystal layer by the generated electric field, thereby controlling polarization of incident light so as to display images.

A liquid crystal display having an embedded microcavity (EM) structure (nano crystal structure) is a display device manufactured by, for example, forming a sacrificial layer with a photoresist, removing the sacrificial layer after coating a support member thereon, and filling a liquid crystal in an empty space formed by removing the sacrificial layer.

However, there may be a difficulty in that an aperture ratio is reduced due to a side wall of the EM structure. That is, the side wall of the EM structure has a tapered structure forming a predetermined angle, and as light leakage occurs in the liquid crystal layer positioned in the corresponding structure because a cell gap is different from other portions, the region should be covered by a light blocking member. As a result, the aperture ratio is reduced.

Further, a common electrode is formed along the side wall of the EM structure, and as a result, there is a difficulty in that an electric field is distorted.

SUMMARY

Exemplary embodiments of the present invention have been made in an effort to provide a liquid crystal display and a manufacturing method thereof having a liquid crystal layer (nano crystal) included in a microcavity with an increased aperture ratio. Further, exemplary embodiments of the present invention have been made in an effort to provide a liquid crystal display and a manufacturing method thereof having a liquid crystal layer (nano crystal) included in a microcavity with reduced distortion of an electric field.

An exemplary embodiment of the present invention provides a manufacturing method of a liquid crystal display which includes forming a sacrificial layer on a liquid crystal panel, forming an etch stop layer on the sacrificial layer, forming a photo resist pattern on the etch stop layer, completing the etch stop layer using the photo resist pattern as a mask, ashing the photo resist pattern and the sacrificial layer by using the completed etch stop layer as a mask, forming a microcavity by removing a portion of the sacrificial layer and forming a liquid crystal layer in the microcavity.

In the forming of the sacrificial layer, the sacrificial layer may be formed by laminating a photo resist on the liquid crystal panel.

The etch stop layer may be made of a transparent conductive material such as ITO or IZO.

The gas used in the ashing may be oxygen or oxygen and sulfur hexafluoride ($SF_6$).

The etch stop layer may serve as a common electrode receiving common voltage.

The manufacturing method of a liquid crystal display may further include removing a portion of the etch stop layer before removing the portion of the sacrificial layer after ashing, and forming a common electrode, a lower insulating layer, or a roof layer at the removed etch stop layer portion.

The etch stop layer may be made of an insulating material such as SiNx or SiOx.

The ashing gas used in the ashing may be oxygen.

The manufacturing method of a liquid crystal display may further include forming a common electrode and a pixel electrode on the liquid crystal panel before forming the sacrificial layer.

An exemplary embodiment of the present invention provides a liquid crystal display, including: an insulation substrate, a microcavity disposed on the insulation substrate and having a sharp side wall, a pixel electrode disposed on the insulation substrate and in the microcavity and a liquid crystal layer disposed in the microcavity. A horizontal width occupied by the sharp side wall is about 1 to about 2 μm.

The liquid crystal display may further include a common electrode, in which the common electrode may be disposed only at a flat portion of the microcavity.

The liquid crystal display may further include a lower insulating layer covering the sharp side wall of the microcavity and the common electrode.

The liquid crystal display may further include a roof layer covering the sharp side wall of the microcavity and the common electrode.

The liquid crystal display may further include a common electrode, in which the common electrode is disposed at a flat portion of the microcavity and on the sharp side wall of the microcavity.

The liquid crystal display may further include a lower insulating layer covering the common electrode.

The liquid crystal display may further include a roof layer covering the common electrode.

The liquid crystal display may further include an etch stop layer, in which the etch stop layer may be disposed only at a flat portion of the microcavity.

The liquid crystal display may further include a lower insulating layer covering the sharp side wall of the microcavity and the etch stop layer.

The liquid crystal display may further include a roof layer covering the sharp side wall of the microcavity and the etch stop layer.

The liquid crystal display may further include a common electrode, in which the common electrode may be formed together with the pixel electrode on the insulation substrate and in the microcavity.

In accordance with an exemplary embodiment of the present invention, a liquid crystal display is provided. The liquid crystal display includes an insulation substrate, a gate line disposed on the insulation substrate, a storage voltage line disposed on the insulation substrate, a gate insulating layer disposed on the gate line and the storage voltage line, a semiconductor disposed on the gate insulating layer, a data conductor including a data line disposed on the semiconductor, a first passivation layer disposed on the data conductor, the semiconductor and the gate insulating layer, a color filter disposed on the first passivation layer, a black matrix disposed on the color filter, a second passivation layer disposed on the color filter and the black matrix, a microcavity disposed on the second passivation layer and having a sharp side wall, a pixel electrode disposed on the second passivation layer and in the microcavity, a liquid crystal layer disposed in the microcavity, a common electrode disposed above the second passivation layer, a roof layer covering the common electrode and an upper insulating layer disposed on the roof layer. A horizontal width occupied by the sharp side wall of the microcavity is about 1 to about 2 μm.

According to exemplary embodiments of the present disclosure, when the sacrificial layer is etched, the common electrode or the etch stop layer formed at the upper portion of the sacrificial layer and etched to narrow the horizontal area occupied by the side wall of the sacrificial layer, and as a result, an aperture ratio is increased. Further, the common electrode is horizontally formed at the upper portion of the sacrificial layer and the common electrode is not formed on the side wall of the sacrificial layer, and as a result, a vertical electric field is generated without distortion.

BRIEF DESCRIPTION OF THE DRAWINGS

Exemplary embodiments of the present invention can be understood in further detail from the following detailed description taken in conjunction with the attached drawings in which.

DETAILED DESCRIPTION OF EXEMPLARY EMBODIMENTS

Figure 1:
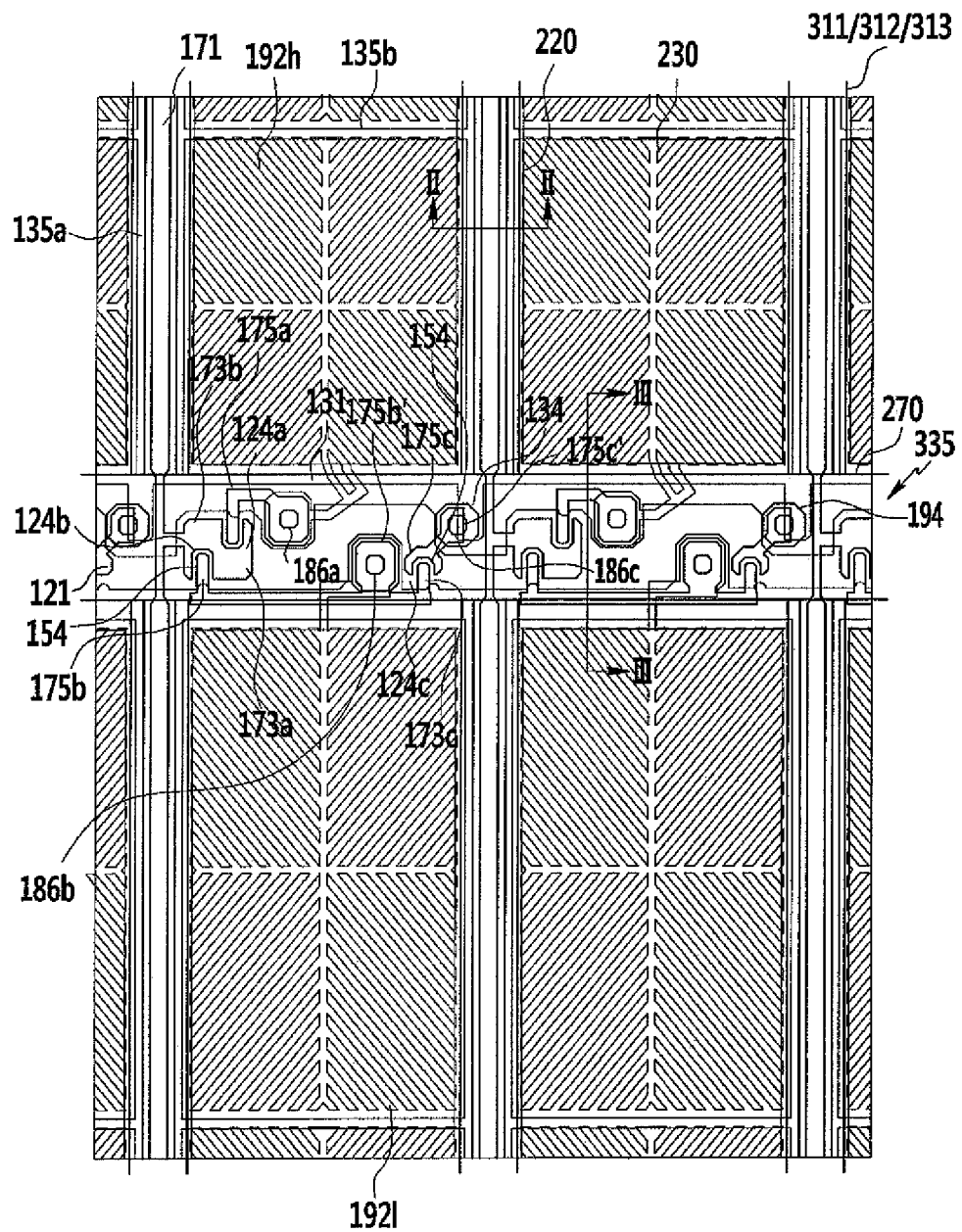
FIG. 1 is a layout view of a liquid crystal display according to an exemplary embodiment of the present invention.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Hereinafter, a liquid crystal display according to an exemplary embodiment of the present invention will be described with reference to FIGS. 1 to 3.

Figure 2:
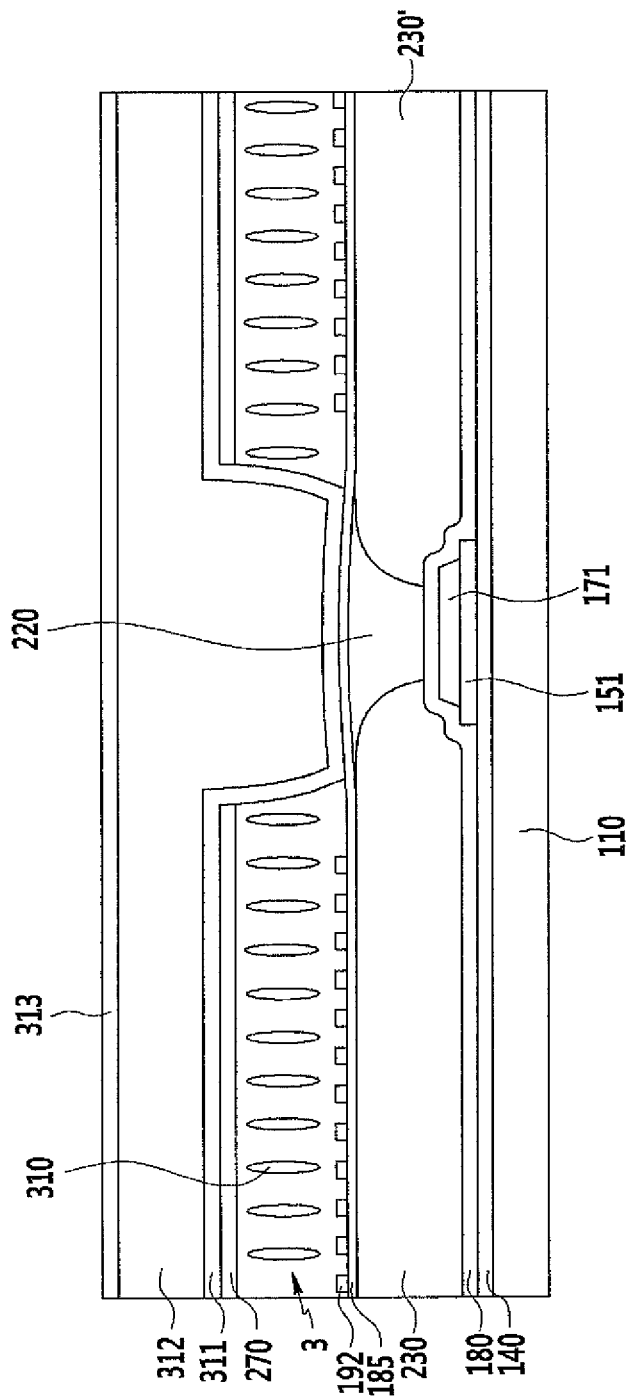
FIG. 2 is a cross-sectional view of FIG. 1 taken along line II-II.
Figure 3:
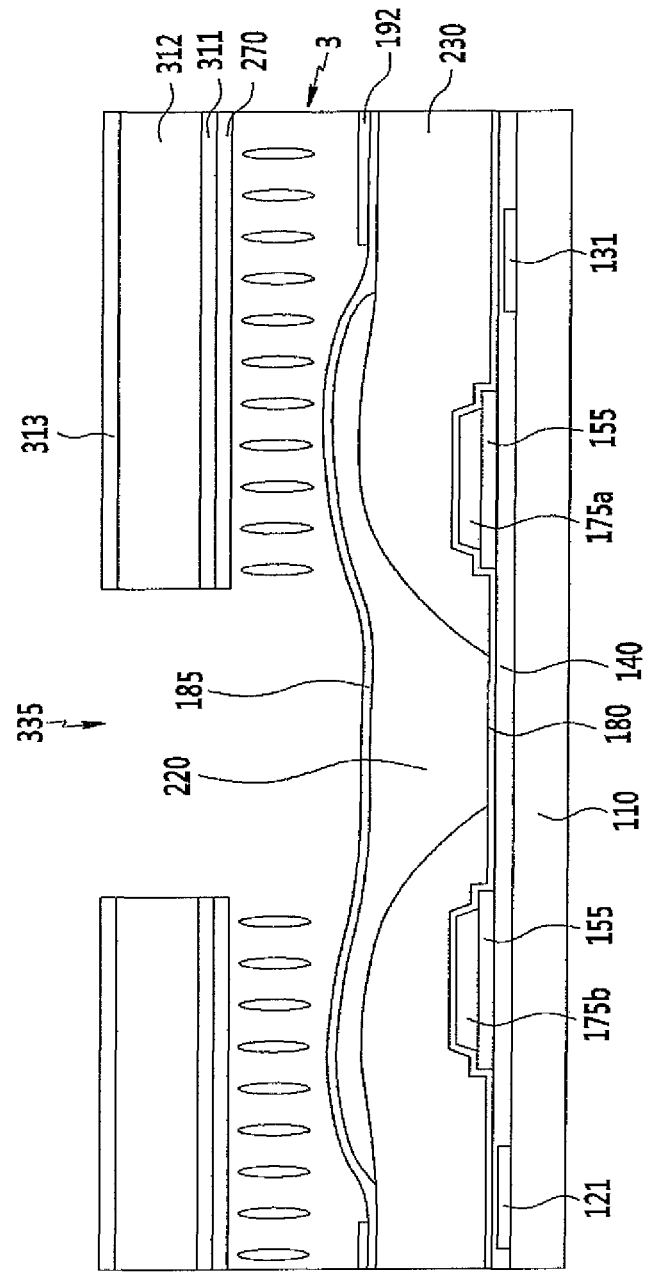
FIG. 3 is a cross-sectional view of FIG. 11 taken along line III-III.

FIG. 1 is a layout view of a liquid crystal display according to an exemplary embodiment of the present invention, FIG. 2 is a cross-sectional view of FIG. 1 taken along line II-II, and FIG. 3 is a cross-sectional view of FIG. 11 taken along line III-III.

A gate line 121 and a storage voltage line 131 are formed on an insulation substrate 110 made of, for example, transparent glass, quartz, plastic, or the like. Also, in an exemplary embodiment, the insulation substrate 110, may be formed of, for example, ceramic or silicon materials. Further, in an exemplary embodiment, the insulation substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The gate line 121 includes, for example, a first gate electrode 124a, a second gate electrode 124b, and a third gate electrode 124c. The storage voltage line 131 includes, for example, storage electrodes 135a and 135b and a protrusion 134 protruding in the gate line 121 direction. The storage electrodes 135a and 135b have, for example, a structure surrounding a first subpixel electrode 192h and a second subpixel electrode 192l of a front pixel. A horizontal portion 135b of the storage electrode of FIG. 1 may be, for example, one wiring which is not separated from the horizontal portion 135b of the front pixel. For example, the gate line 121 may be formed of one of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), cobalt (Co), manganese (Mn) and any mixtures or alloys thereof. In addition, the gate line 121, may include, for example, a transparent conductive material such as an indium tin oxide (ITO), an indium zinc oxide (IZO) and an aluminum doped zinc oxide (AZO).

A gate insulating layer 140 is formed on the gate line 121 and the storage voltage line 131. A semiconductor 151 positioned below a data line 171, a semiconductor 155 positioned below a source/drain electrode, and a semiconductor 154 positioned at a channel part of a thin film transistor are formed on the gate insulating layer 140. For example, the gate insulating layer 140 may be made of silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

The semiconductors 151, 154, 155, may be made of, for example, amorphous silicon (e.g. hydrogenated amorphous silicon). Alternatively, the semiconductors 151, 154, 155 may be formed of, for example, polysilicon, micro-crystal silicon, or single crystal silicon.

A plurality of ohmic contacts may be formed on the respective semiconductors 151, 154, and 155 and between the data line 171 and the source/drain electrode, and are omitted in the drawings.

On the respective semiconductors 151, 154, and 155 and the gate insulating layer 140, a data conductor 171, 173c, 175a, 175b, 175c that includes a plurality of data lines 171 including a first source electrode 173a and a second source electrode 173b, a first drain electrode 175a, a second drain electrode 175b, a third source electrode 173c, and a third drain electrode 175c is formed.

The first gate electrode 124a, the first source electrode 173a, and the first drain electrode 175a form a first thin film transistor Qa together with the semiconductor 154, and a channel of the thin film transistor is formed at the semiconductor portion 154 between the first source electrode 173a and the first drain electrode 175a. Similarly, the second gate electrode 124b, the second source electrode 173b, and the second drain electrode 175b form a second thin film transistor Qb together with the semiconductor 154, and a channel of the thin film transistor is formed at the semiconductor portion 154 between the second source electrode 173b and the second drain electrode 175b. The third gate electrode 124c, the third source electrode 173c, and the third drain electrode 175c form a third thin film transistor Qc together with the semiconductor 154, and a channel of the thin film transistor is formed at the semiconductor portion 154 between the third source electrode 173c and the third drain electrode 175c.

For example, the data line 171 of the present exemplary embodiment has a structure with a narrow width in a thin film transistor formation region around an extension 175c' of the third drain electrode 175c. This structure is a structure for keeping a distance from the adjacent wiring and reducing signal interference, but does not necessarily need to be formed like this.

A first passivation layer 180 is formed on the data conductor 171, 173c, 175a, 175b, and 175c and the exposed semiconductor 154 portion. The first passivation layer 180 may include, for example, an inorganic insulator such as silicon nitride (SiNx) and silicon oxide (SiOx) or an organic insulator. For example, the organic insulator of the first passivation layer 180 may include benzocyclobutene (BCB), acryl-based resin or a combination thereof.

A color filter 230 is formed on the passivation layer 180. The color filter 230 having the same color is formed in adjacent pixels in a vertical direction (data line direction). Further, adjacent pixels in a horizontal direction (gate line direction) have color filters 230 and 230' having, for example, different colors, and two color filters 230 and 230' may be overlapped with each other on the data line 171. The color filters 230 and 230' may display, for example, one color of primary colors such as three primary colors of red, green, and blue. However, the color is not limited to the three primary colors of red, green, and blue. Alternatively, for example, in an embodiment, the color filters 230 and 230' may display one color of cyan, magenta, yellow, and white.

A black matrix 220 is formed, for example, on the color filters 230 and 230'. The black matrix 220 is formed, for example, based on a region (hereinafter, referred to as a 'transistor formation region') where the gate line 121, the storage voltage line 131, and the thin film transistor are formed and a region where the data line 171 is formed and has a lattice structure having openings corresponding to a region displaying images. The color filter 230 is formed, for example, in the opening of the black matrix 220. Further, the black matrix 220 is made of a material which does not transmit light.

A second passivation layer 185 covering the color filter 230 and the black matrix 220 is formed, for example, on the color filter 230 and the black matrix 220. The second passivation layer 185 may contain, for example, an inorganic insulator such as silicon nitride (SiNx) and silicon oxide (SiOx) or an organic insulator. For example, the organic insulator of the second passivation layer 185 may include benzocyclobutene (BCB), acryl-based resin or a combination thereof. Unlike those illustrated in cross-sectional views of FIGS. 2 and 3, in the case where a step occurs due to a thickness difference between the color filter 230 and the black matrix 220, the second passivation layer 185 may contain, for example, an organic insulator to reduce or remove the step.

A first contact hole 186a and a second contact hole 186b which expose the first drain electrode 175a and an extension 175b' of the second drain electrode 175b, respectively are formed, for example, in the color filter 230, the black matrix 220, and the passivation layers 180 and 185. Further, a third contact hole 186c which exposes, for example, a protrusion 134 of the storage voltage line 131 and an extension 175c' of the third drain electrode 175c is formed in the color filter 230, the black matrix 220, and the passivation layers 180 and 185.

In the exemplary embodiment, the contact holes 186a, 186b, and 186c are formed, for example, even in the black matrix 220 and the color filter 230, but the black matrix 220 and the color filter 230 may be actually difficult to etch the contact holes 186a, 186b, and 186c as compared with the passivation layers 180 and 185 according to a material. Therefore, the black matrix 220 or the color filter 230 may be formed, for example, at the position where the contact holes 186a, 186b, and 186c are formed in advance during etching of the black matrix 220 or the color filter 230.

Meanwhile, according to an exemplary embodiment, the color filter 230 and the passivation layers 180 and 185 are just etched by changing a position of the black matrix 220 to form the contact holes 186a, 186b, and 186c.

On the second passivation layer 185, a pixel electrode 192 including the first subpixel electrode 192h and the second subpixel electrode 192l is formed. The pixel electrode 192 may be made of, for example, a transparent conductive material such as ITO, IZO, aluminum zinc oxide (AZO), cadmium tin oxide (CTO), or a reflective electric conductor such as, for example, aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof. In addition, the pixel electrode 192 can be formed of, for example, transflective materials or a combination of transparent materials and reflective materials.

The first subpixel electrode 192h and the second subpixel electrode 192l are, for example, adjacent to each other in a column direction, have the overall quadrangular shape, and include a cross stem configured by a horizontal stem and a vertical stem crossing the horizontal stem. Further, the first subpixel electrode 192h and the second subpixel electrode 192l are, for example, divided into four subregions by the horizontal stem and the vertical stem, and each subregion includes a plurality of minute branches.

The minute branches of the first subpixel electrode 192h and the second subpixel electrode 192l form, for example, an angle of approximately 40 to 45 degrees with the gate line 121 or the horizontal stem. Further, the minute branches of two adjacent subregions may be, for example, perpendicular to each other. Further, a width of the minute branch may be, for example, gradually increased or distances between the minute branches may be different from each other.

The first subpixel electrode 192h and the second subpixel electrode 192l are physically and electrically connected with the first drain electrode 175a and the second drain electrode 175b through, for example, the contact holes 186a and 186b and receive data voltage from the first drain electrode 175a and the second drain electrode 175b.

Meanwhile, a connecting member 194 electrically connects the extension 175c' of the third drain electrode 175c and the protrusion 134 of the storage voltage line 131 through, for example, the third contact hole 186c. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

Here, an area of the second subpixel electrode 192l may be, for example, about 1 to about 2 times larger than an area of the first subpixel electrode 192h.

Meanwhile, an opening which, for example, may collect gas discharged from the color filter 230 and a cover which covers the corresponding opening with the same material as the pixel electrode 192 thereon may be formed in the second passivation layer 185. The opening and the cover are structures for preventing gas discharged from the color filter 230 from being transferred to other elements and may be not necessarily included.

Figure 13A:
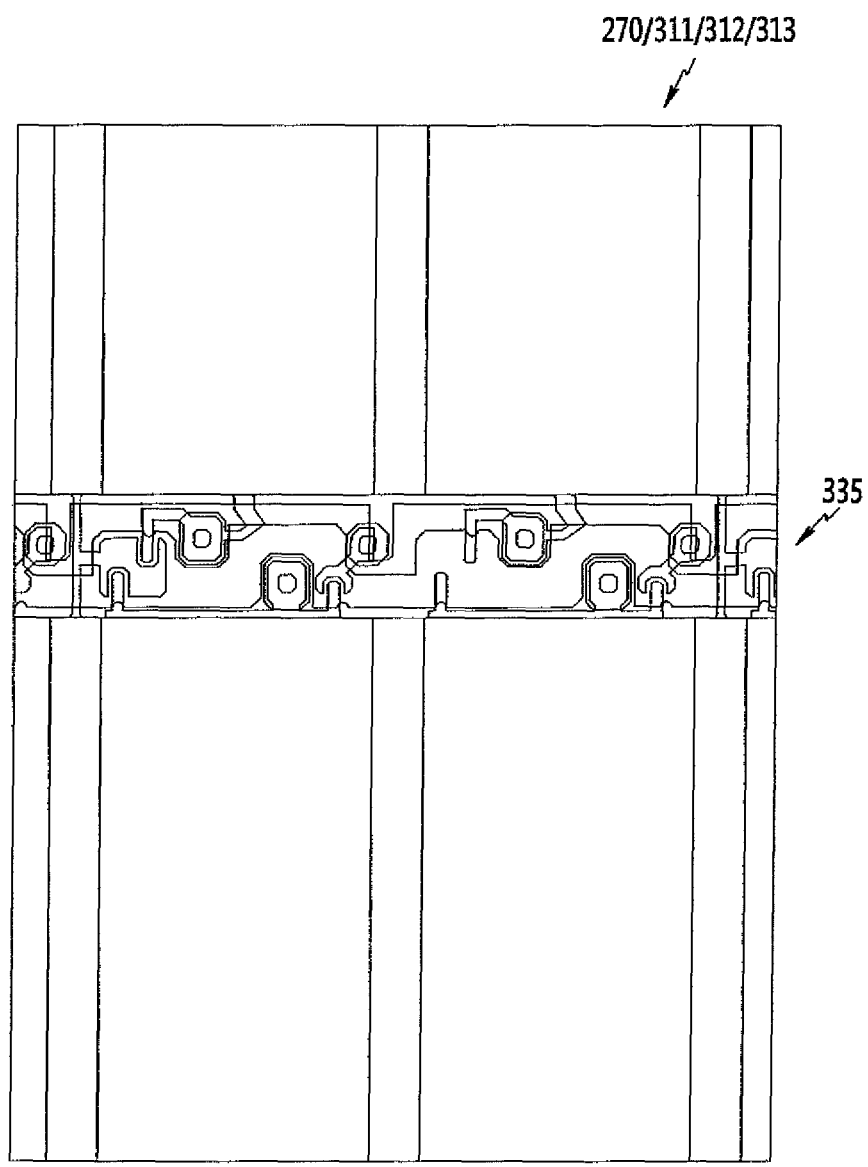
Figure 13B:
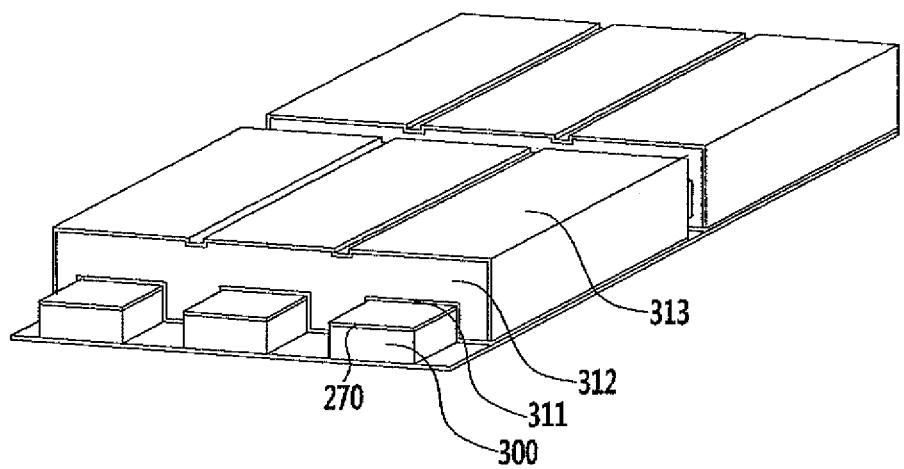
Figure 13C:
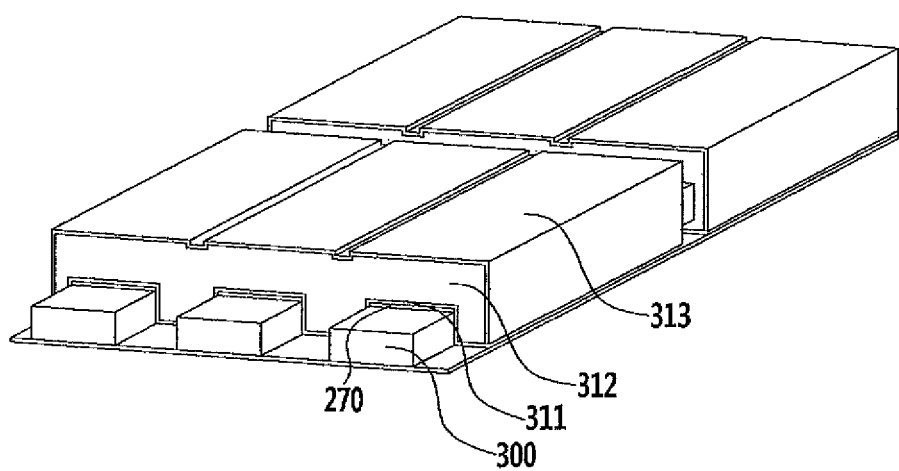
Figure 13D:
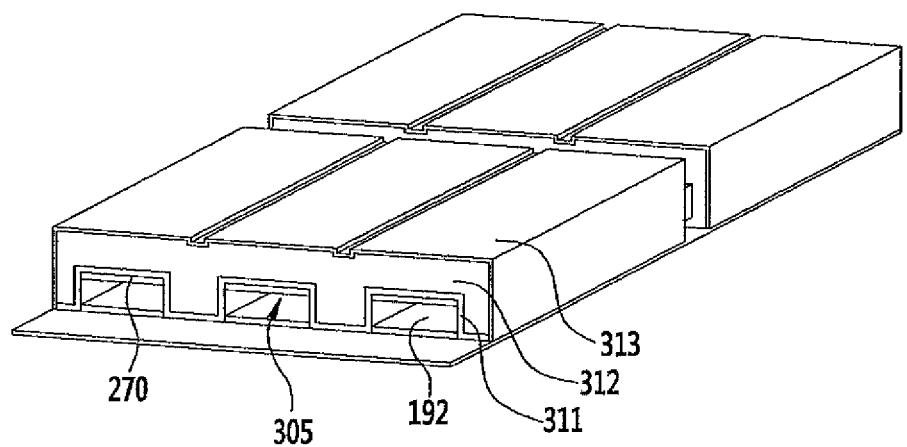

A common electrode 270 is positioned, for example, on the second passivation layer 185 and the pixel electrode 192 and above the liquid crystal layer 3 injected in a microcavity 305 (see FIGS. 13D and 13E). The common electrode 270 is formed, for example, only at a flat portion above the microcavity 305 or the liquid crystal layer 3 and formed only at a portion corresponding to the portion with the pixel electrode 192. As the common electrode 270 is not positioned at the side of the microcavity 305 or the liquid crystal layer 3, a vertical electric field between the common electrode 270 and the pixel electrode 192 may be uniformly formed except for the outer portion and thus there is a benefit in that distortion of the electric field is small. Further, the common electrode 270 may receive, for example, common voltage Vcom from the outside through a separate constituent element, and the adjacent common electrodes 270 may be connected to each other through a transistor formation area (or around a liquid crystal injection hole 335). In this case, some of the common electrodes 270 remain at the liquid crystal injection hole 335 portion to have a structure in which the adjacent common electrodes 270 are connected to each other.

The reason that the common electrode 270 may maintain level even on the microcavity is because a roof layer 312 to be described below supports the common electrode 270.

The common electrode 270 is made of, for example, a transparent conductive material such as ITO, IZO, AZO, or CTO and serves to generate an electric field together with the pixel electrode 192 to control an alignment direction of the liquid crystal molecules 310.

A lower insulating layer 311 is positioned on the common electrode 270 and the second passivation layer 185 and the side of the liquid crystal layer 3 (or the side of the microcavity 305). The lower insulating layer 311 may have, for example, a liquid crystal injection hole 335 at one side thereof to fill the liquid crystal in the microcavity 305. The lower insulating layer 311 may contain, for example, an inorganic insulating material such as silicon nitride (SiNx). The liquid crystal injection hole 335 may be used when removing a sacrificial layer for forming the microcavity 305. This will be described in detail when describing a manufacturing method.

Further, a side wall of the microcavity 305 in which the liquid crystal layer 3 is injected is sharply formed and thus there is a benefit in that a horizontal width in a region where a cell gap of the liquid crystal layer 3 is not sufficient is largely decreased. The horizontal width occupied by the side wall of the microcavity 305 or the liquid crystal layer 3 is, for example, about 1 to about 2 μm. As a result, a horizontal width covering the microcavity 305 or the liquid crystal layer 3 by the black matrix 220 may be, for example, about 1 to about 2 μm.

Further, an alignment layer (not illustrated) may be formed, for example, in the microcavity 305 to align the liquid crystal molecules injected in the microcavity 305. The alignment layer may contain at least one of materials such as, for example, polyamic acid, polysiloxane, or polyimide which are generally used as a liquid crystal alignment layer.

The liquid crystal layer 3 is formed, for example, in the microcavity 305 (accurately, in the alignment layer). The liquid crystal molecules 310 are initially aligned by the alignment layer and the alignment direction is changed according to the applied electric field. A height of the liquid crystal layer 3 corresponds to, for example, a height of the microcavity 305. The liquid crystal layer 3 positioned in the microcavity 305 is referred to as a nano crystal.

The liquid crystal layer 3 formed in the microcavity 305 may be injected in the microcavity 305 by using, for example, capillary force, and the alignment layer may be formed by capillary force.

The roof layer 312 is formed, for example, on the lower insulating layer 311. The roof layer 312 may serve to support a space between the pixel electrode 192 and the common electrode 270 (microcavity) and the nano crystal to be formed. The roof layer 312 according to the present exemplary embodiment serves to support the microcavity 305 above the common electrode 270 at a predetermined thickness and may have, for example, the liquid crystal injection hole 335 at one side so as to fill the liquid crystal in the microcavity 305.

An upper insulating layer 313 is formed, for example, on the roof layer 312. The upper insulating layer 313 may contain, for example, an inorganic insulating material such as silicon nitride (SiNx). The roof layer 312 and the upper insulating layer 313 are, for example, patterned together with the lower insulating layer 311 to form the liquid crystal injection hole 335.

Alternatively, for example, in an exemplary embodiment, the lower insulating layer 311 and the upper insulating layer 313 may be omitted.

A capping layer (not illustrated) is formed, for example, on the upper insulating layer 313 to prevent the liquid crystal molecules 310 from be discharged outside through the liquid crystal injection hole 335.

A polarizer (not illustrated) is positioned below the insulation substrate 110 and above the upper insulating layer 313 (or above the capping layer). The polarizer may include, for example, a polarized element generating polarization and a tri-acetyl-cellulose (TAC) layer for ensuring durability, and according to an exemplary embodiment, directions in transmissive axes of an upper polarizer and a lower polarizer may be vertical or parallel to each other.

Hereinafter, a manufacturing method of the liquid crystal display according to an exemplary embodiment of the present invention will be described with reference to FIGS. 4 to 13D.

FIGS. 4 to 13D are diagrams sequentially arranging a manufacturing method of the liquid crystal display of FIG. 1 according to an exemplary embodiment.

Figure 4:
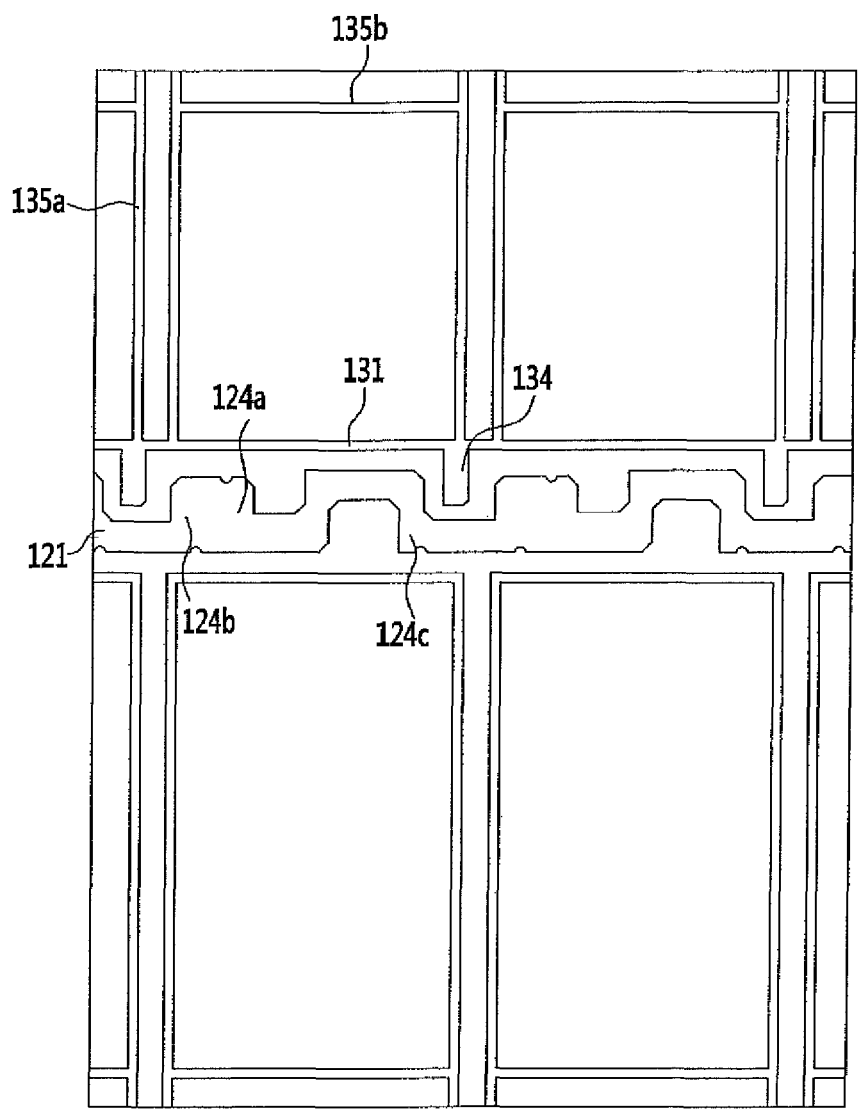
FIGS. 4 to 13D illustrate a manufacturing method of the liquid crystal display of FIG. 1 according to an exemplary embodiment.

First, FIG. 4 is a layout view of the gate line 121 and the storage voltage line 131 formed on the insulation substrate 110.

Referring to FIG. 4, the gate line 121 and the storage voltage line 131 are formed on the insulation substrate 110 made of, for example, transparent glass, quartz, or plastic. Also, in an exemplary embodiment, the insulation substrate 110, may be formed of, for example, ceramic or silicon materials. Further, in an exemplary embodiment, the insulation substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The gate line 121 and the storage voltage line 131 may be simultaneously formed by the same mask with the same material. For example, in an exemplary embodiment, the gate line 121 and the storage voltage line 131 may each be formed of one of aluminum (Al), copper (Cu), molybdenum (Mo), titanium (Ti), nickel (Ni), tungsten (W), gold (Au), palladium (Pd), platinum (Pt), chromium (Cr), neodymium (Nd), zinc (Zn), cobalt (Co), manganese (Mn) and any mixtures or alloys thereof. In addition, the gate line 121 and storage voltage line 131, may include, for example, a transparent conductive material such as an indium tin oxide (ITO), an indium zinc oxide (IZO) and an aluminum doped zinc oxide (AZO).

Further, the gate line 121 includes, for example, a first gate electrode 124a, a second gate electrode 124b, and a third gate electrode 124c, and the storage voltage line 131 includes a protrusion 134 protruding in the direction of the storage electrodes 135a and 135b and the gate line 121. The storage electrodes 135a and 135b have, for example, a structure surrounding the first subpixel electrode 192h and the second subpixel electrode 192l of a front pixel. As data voltage is applied to the gate line 121 and storage voltage is applied to the storage voltage line 131, the gate line 121 and the storage voltage line 131 are separated from each other. The storage voltage may have a predetermined voltage level or have a swing voltage level.

The gate insulating layer 140 covering the gate line 121 and the storage voltage line 131 is formed on the gate line 121 and the storage voltage line 131. For example, the gate insulating layer 140 may be made of silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

Figure 5:
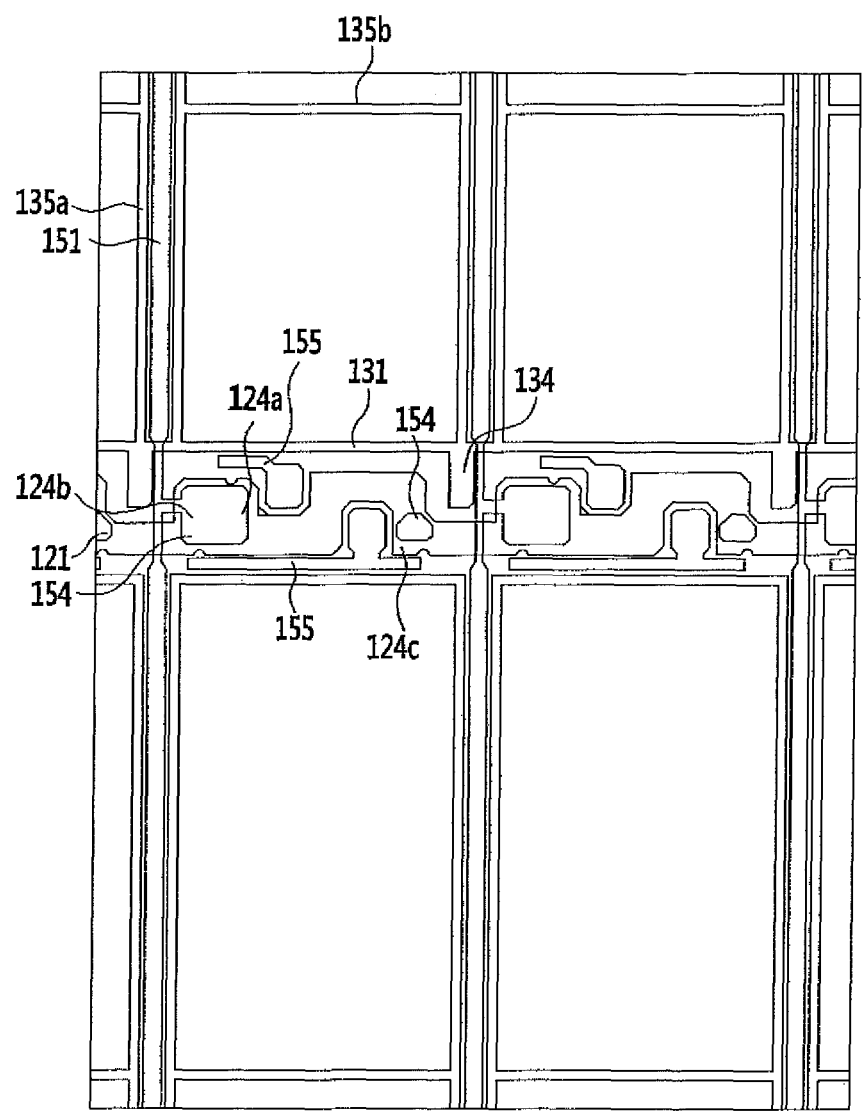
Figure 6:
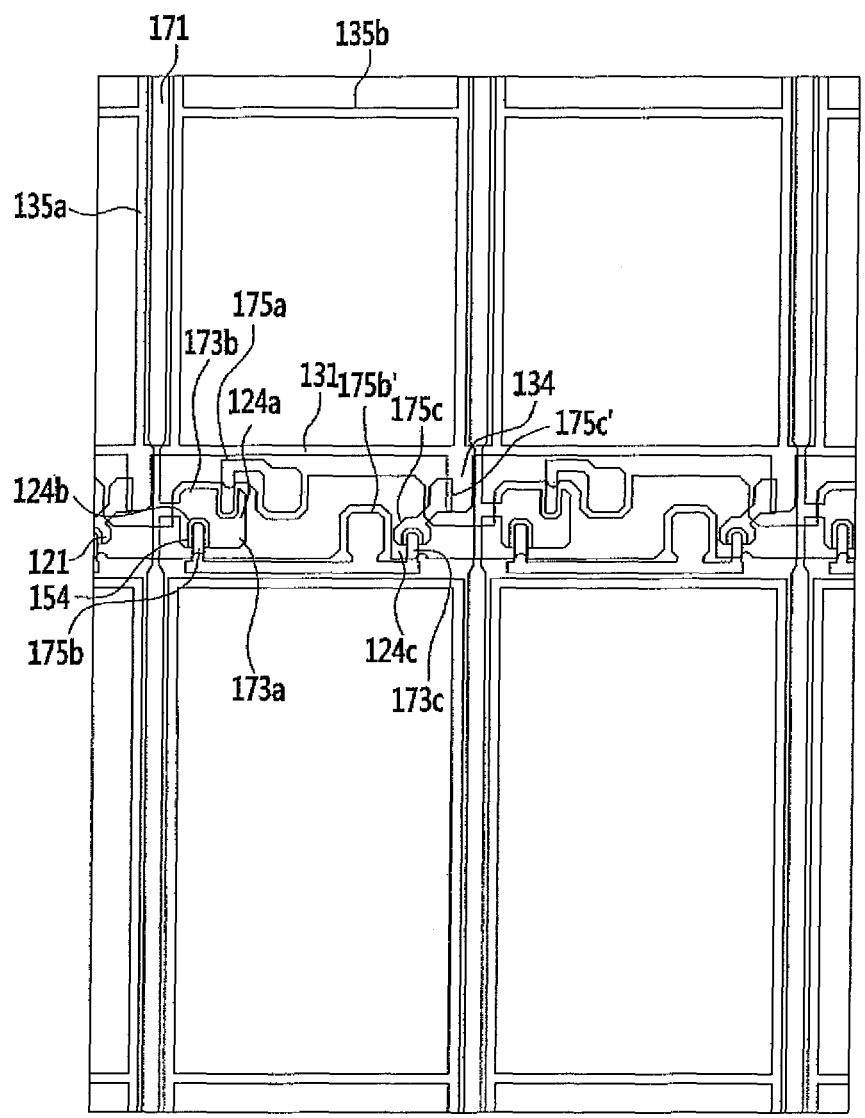

Thereafter, as illustrated in FIGS. 5 and 6, the semiconductors 151, 154, and 155, the data line 171, and the source/drain electrodes 173a, 173b, 173c, 175a, 175b, and 175c are formed on the gate insulating layer 140.

FIG. 5 illustrates a layout view that the semiconductors 151, 154, and 155 are formed, and FIG. 6 illustrates a layout view that the data line 171 and the source/drain electrodes 173a, 173b, 173c, 175a, 175b, and 175c are formed, but the semiconductors 151, 154, and 155, the data line 171, and the source/drain electrodes 173a, 173b, 173c, 175a, 175b, and 175c may be actually formed together by, for example, the following process described below.

That is, materials for forming the semiconductors and material for forming the data line and the source/drain electrodes are, for example, sequentially laminated. Thereafter, for example, two patterns are formed together through one process of exposure, developing, and etching by using one mask (slit mask or transflective mask). In this case, so that the semiconductor 154 positioned at the channel part of the thin film transistor is not etched, the corresponding portion is exposed through, for example, the slit or transflective region of the mask.

A plurality of ohmic contacts may be formed on the respective semiconductors 151, 154, and 155 and between the data line 171 and the source/drain electrodes.

The first passivation layer 180 is formed all over the data conductor 171, 173c, 175a, 175b, 175c and the exposed semiconductor 154 portion. The first passivation layer 180 may contain, for example, an inorganic insulator such as silicon nitride (SiNx) and silicon oxide (SiOx) or an organic insulator. For example, the organic insulator of the first passivation layer 180 may include benzocyclobutene (BCB), acryl-based resin or a combination thereof.

Figure 7A:
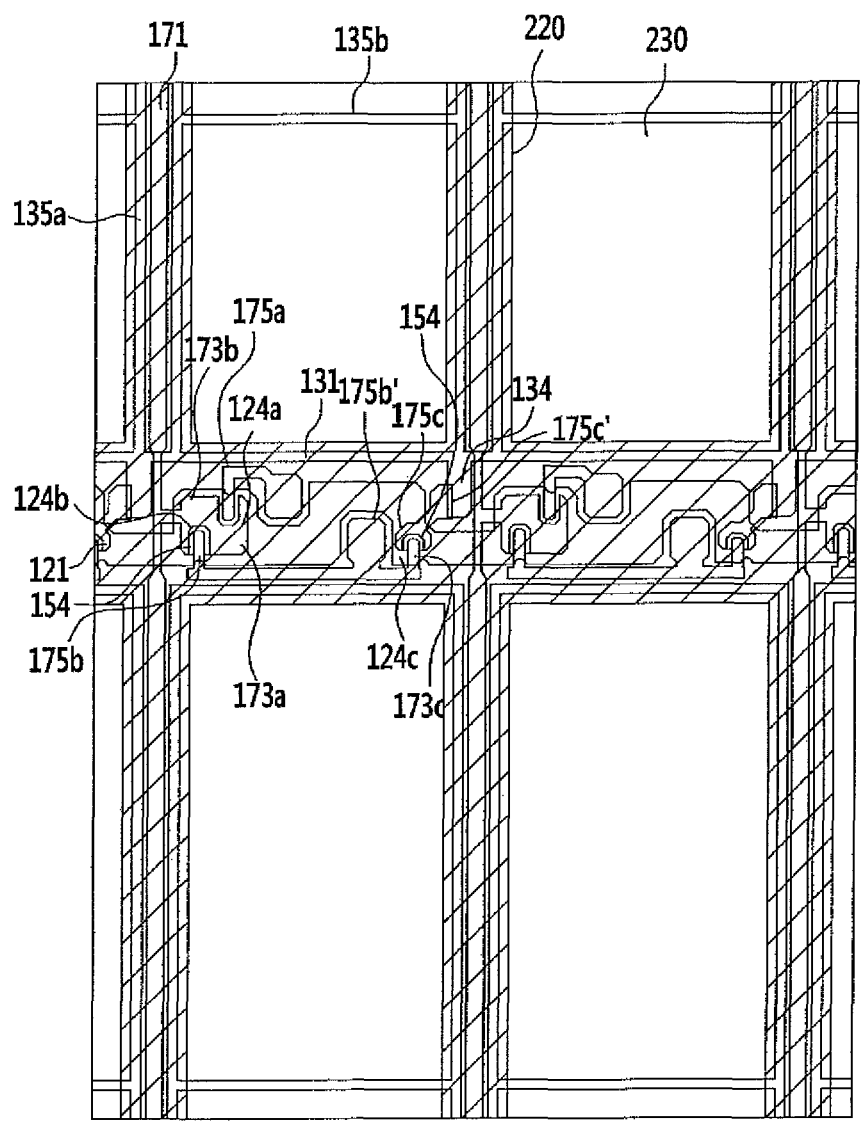

Thereafter, as illustrated in FIGS. 7A and 7B, the color filter 230 and the black matrix 220 are formed, for example, on the first passivation layer 180. Here, FIG. 7A is a layout view corresponding to FIG. 1, FIG. 7B is a cross-sectional view corresponding to FIG. 2, and FIG. 7B illustrates the color filter 230 and the black matrix 220 formed after exposing and etching.

For example, when forming the color filter 230 and the black matrix 220, the color filter 230 is formed. The color filter 230 having one color is elongated, for example, in a vertical direction (data line direction), and the color filters 230 and 230' having different colors are formed in adjacent pixels in a horizontal direction (gate line direction). As a result, exposing, developing, and etching processes should be performed for each color filter 230. A liquid crystal display including, for example, three primary colors forms the color filter 230 by, for example, the exposing, developing, and etching processes three times. In this case, for example, the color filter 230' which is first formed on the data line 171 is positioned at the lower portion and the color filter 230 which is formed thereafter is formed at the upper portion, and the color filter 230' and the color filter 230 may be overlapped with each other.

The color filter 230 may be removed, for example, in advance at the position where the contact holes 186a, 186b, and 186c are formed during etching of the color filter 230.

The black matrix 220 is formed, for example, on the color filter 230 with a non-transmissive material. Referring to an oblique portion (illustrating the black matrix 220) of FIG. 7A, the black matrix 220 is formed in a lattice structure having an opening corresponding to a region where an image is displayed. The color filter 230 is formed, for example, in the opening.

The black matrix 220 has a portion formed, for example, in a horizontal direction along a transistor formation region with the gate line 121, the storage voltage line 131, and the thin film transistor and a portion formed in a vertical direction based on a region with the data line 171, as illustrated in FIG. 7A.

Figure 8A:
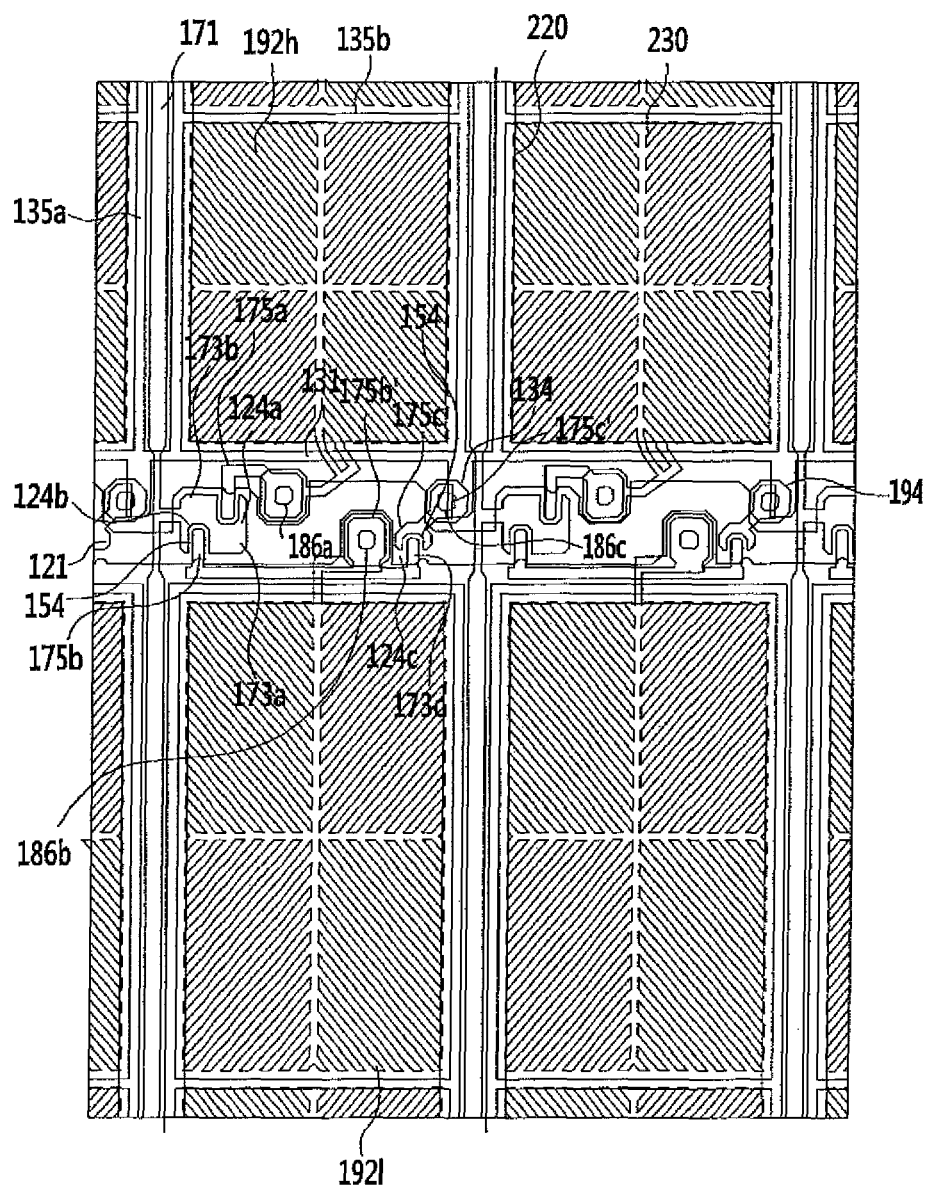
Figure 8B:
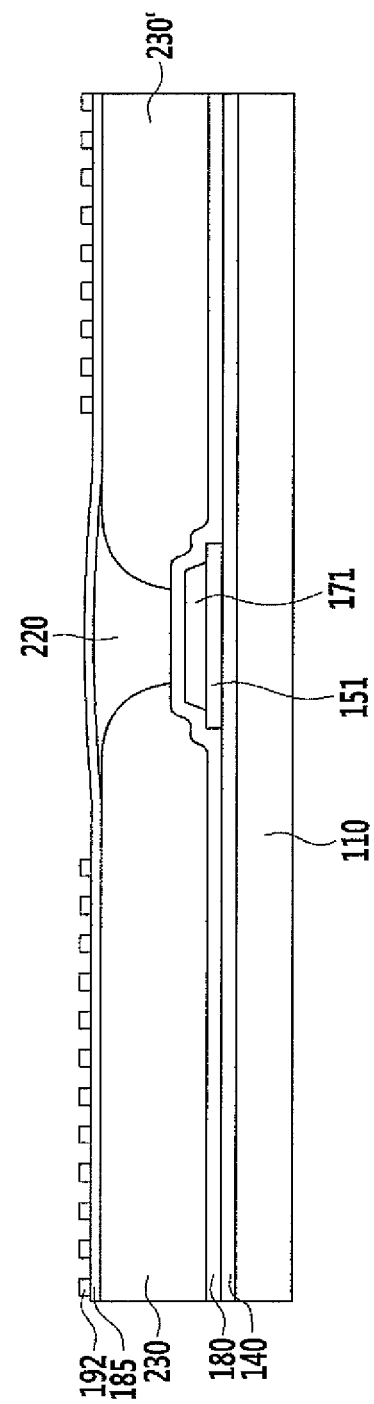

Referring to FIGS. 8A and 8B, the second passivation layer 185 is formed, for example, all over the color filter 230 and the black matrix 220. The second passivation layer 185 may contain, for example, an inorganic insulator such as silicon nitride (SiNx) and silicon oxide (SiOx) or an organic insulator. For example, the organic insulator of the second passivation layer 185 may include benzocyclobutene (BCB), acryl-based resin or a combination thereof.

Thereafter, a first contact hole 186a and a second contact hole 186b exposing, for example, the first drain electrode 175a and the extension 175b' of the second drain electrode 175b, respectively are formed in the color filter 230, the black matrix 220, and the passivation layers 180 and 185. Further, for example, in the color filter 230, the black matrix 220, and the passivation layers 180 and 185, the third contact hole 186c exposing the protrusion 134 of the storage voltage line 131 and the extension 175c' of the third drain electrode 175c is formed.

Thereafter, the pixel electrode 192 including the first subpixel electrode 192h and the second subpixel electrode 192l is formed, for example, on the second passivation layer 185. In this case, the pixel electrode 192 may be made of, for example, a transparent conductive material such as ITO, IZO, AZO, CTO, or a reflective electric conductor such as, for example, aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof. In addition, the pixel electrode 192 can be formed of, for example, transflective materials or a combination of transparent materials and reflective materials. Further, the first subpixel electrode 192h and the second subpixel electrode 192l are physically and electrically connected with the first drain electrode 175a and the second drain electrode 175b through the contact holes 186a and 186b, respectively. Further, the connecting member 194 that electrically connects the extension 175c' of the third drain electrode 175c and the protrusion 134 of the storage voltage line 131 through the third contact hole 186c is formed. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

Here, FIG. 8B is a diagram corresponding to FIG. 2 and illustrates a cross-sectional view of the liquid crystal display formed up to FIG. 8A.

Figure 9A:
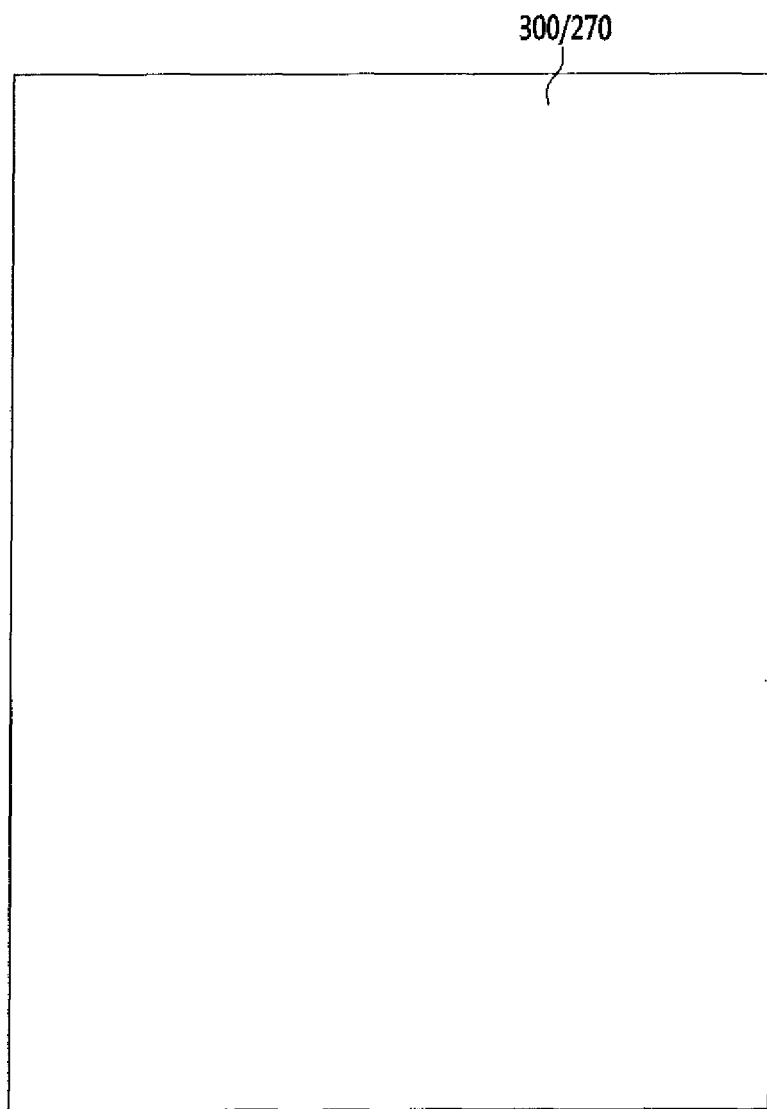
Figure 9B:
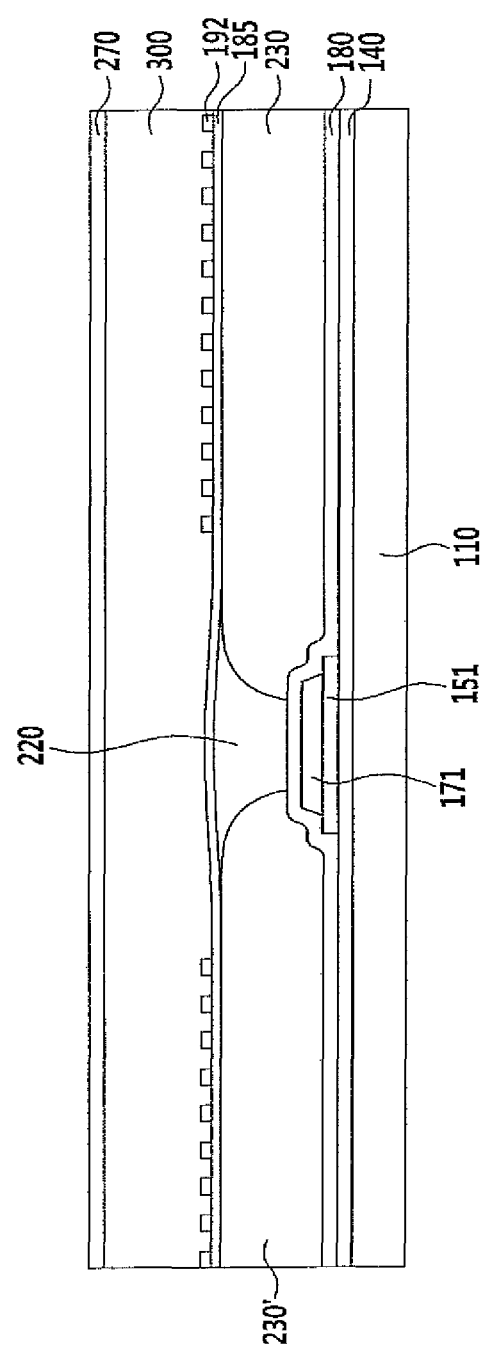
Figure 9C:
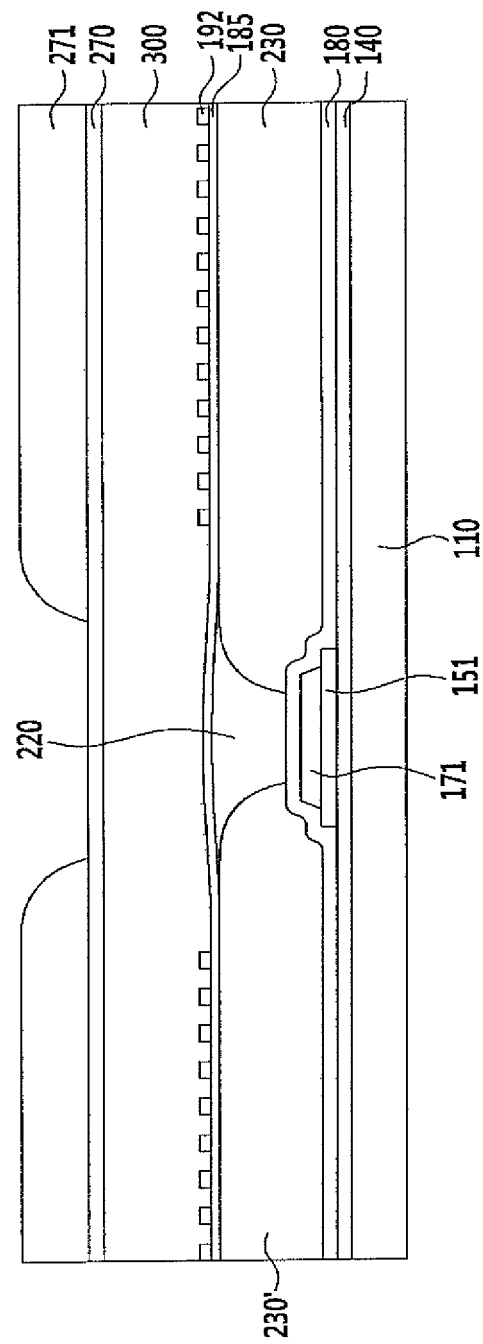
Figure 9D:
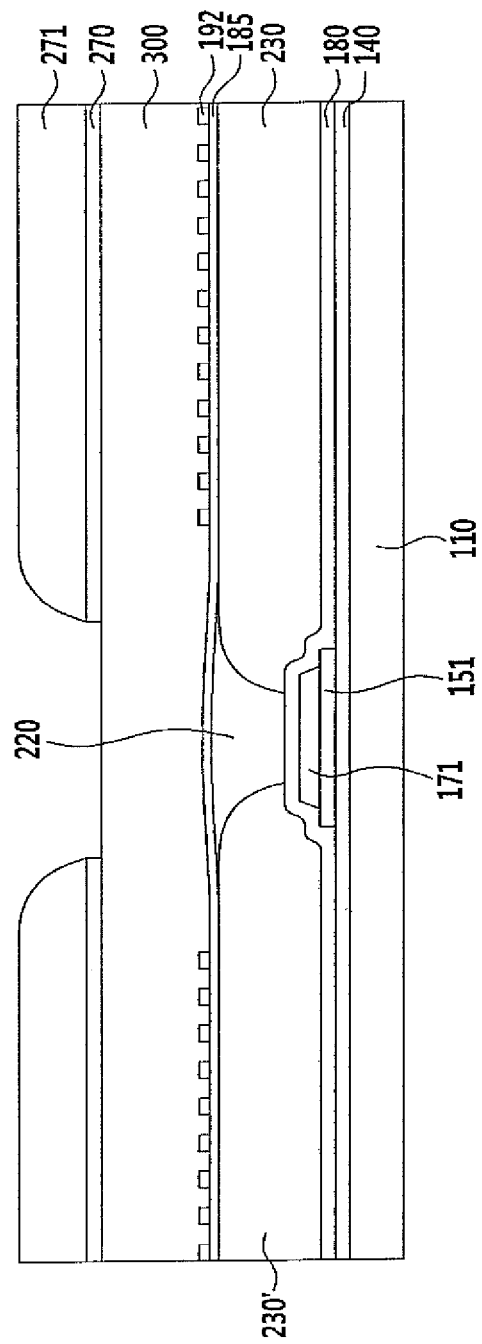
Figure 9E:
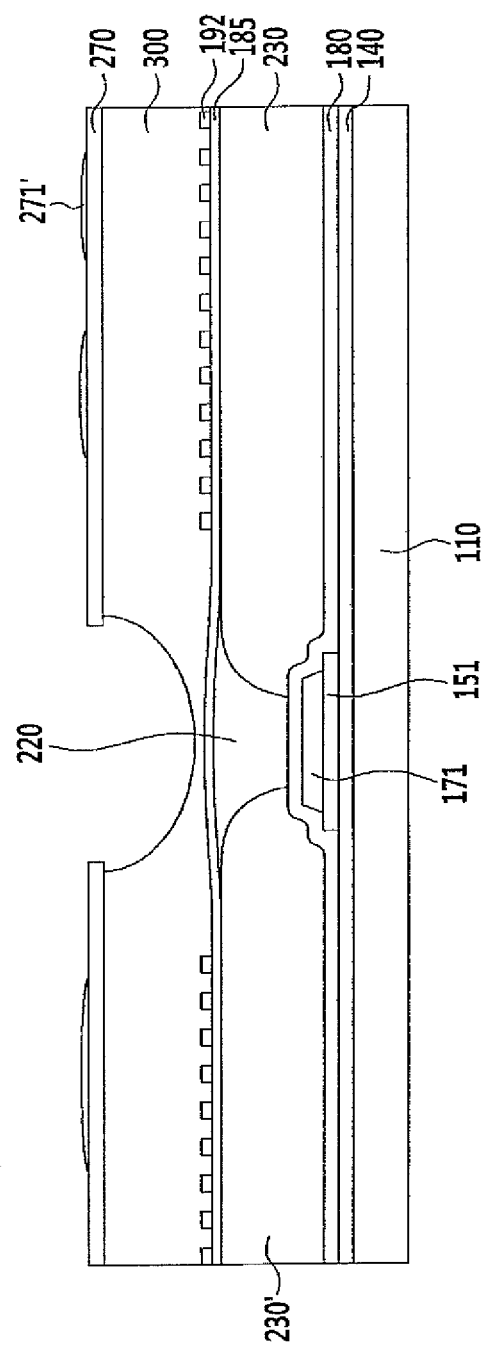
Figure 9F:
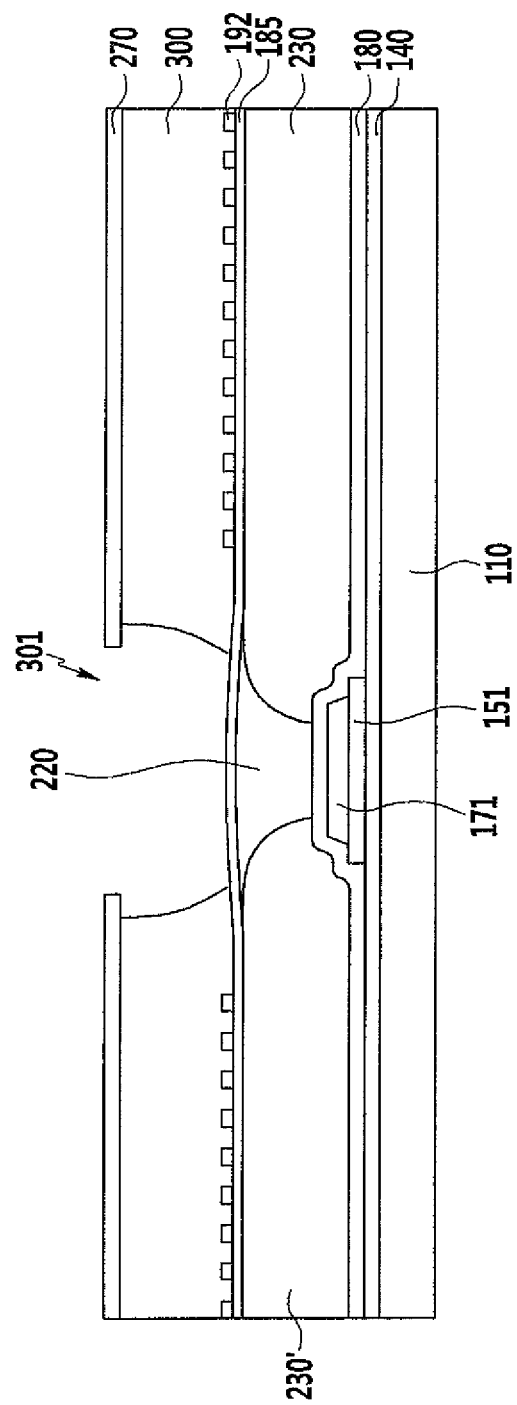
Figure 9G:
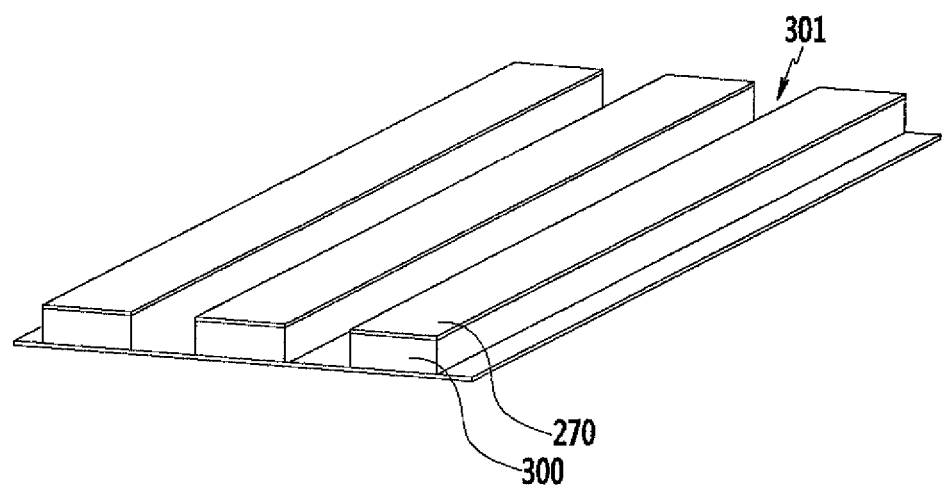

Thereafter, as illustrated in FIG. 9G, a sacrificial layer 300 and the common electrode 270 are formed. Here, the common electrode 270 serves as an etch stop layer of the sacrificial layer 300.

As illustrated in FIG. 9G, the sacrificial layer 300 and the common electrode 270 are manufactured by, for example, the following method.

As illustrated in FIGS. 9A and 9B, a photo resist PR is, for example, laminated on the entire surface of the liquid crystal panel with the second passivation layer 185, the pixel electrode 192, and the like to form the sacrificial layer 300 and thereafter, a transparent conductive material such as ITO, IZO, AZO or CTO is laminated to form the common electrode 270.

Thereafter, as illustrated in FIG. 9C, the photo resist PR is, for example, laminated and then exposed and developed to form a photo resist pattern 271.

Next, as illustrated in FIG. 9D, the transparent conductive material is, for example, etched by using the photo resist pattern 271 as a mask to complete the common electrode 270.

Next, as illustrated in FIGS. 9E and 9F, the exposed sacrificial layer 300 and photo resist pattern 271 are removed by, for example, ashing using the completed common electrode 270 as a mask. After ashing, the opening 301, the region where the exposed sacrificial layer is removed, is formed between the sacrificial layers 300. FIG. 9E is a cross-sectional view during the ashing process. Thus, the photo resist patterns not totally removed is also illustrates as 271' in FIG. 9E. In this case, the ashing gas may include, for example, oxygen (O2) or both oxygen (O2) and sulfur hexafluoride ($SF_6$). As the common electrode 270 made of the transparent conductive material is not etched, but the sacrificial layer 300 and the photo resist pattern 271 made of the photo resist PR are just removed by the ashing gas, the ashing gas has a state like FIG. 9F via a state like FIG. 9E when the ashing is completed. For example, when the photo resist is removed by the ashing, anisotropic etching is performed in dry etch equipment and thus the side wall of the sacrificial layer 300 may be substantially vertically formed. As a result, the side wall of the sacrificial layer 300 does not largely occupy the horizontal area.

Accordingly, as illustrated in FIG. 9G, linear patterns of the sacrificial layer 300 and the common electrode 270 are completed.

Figure 10A:
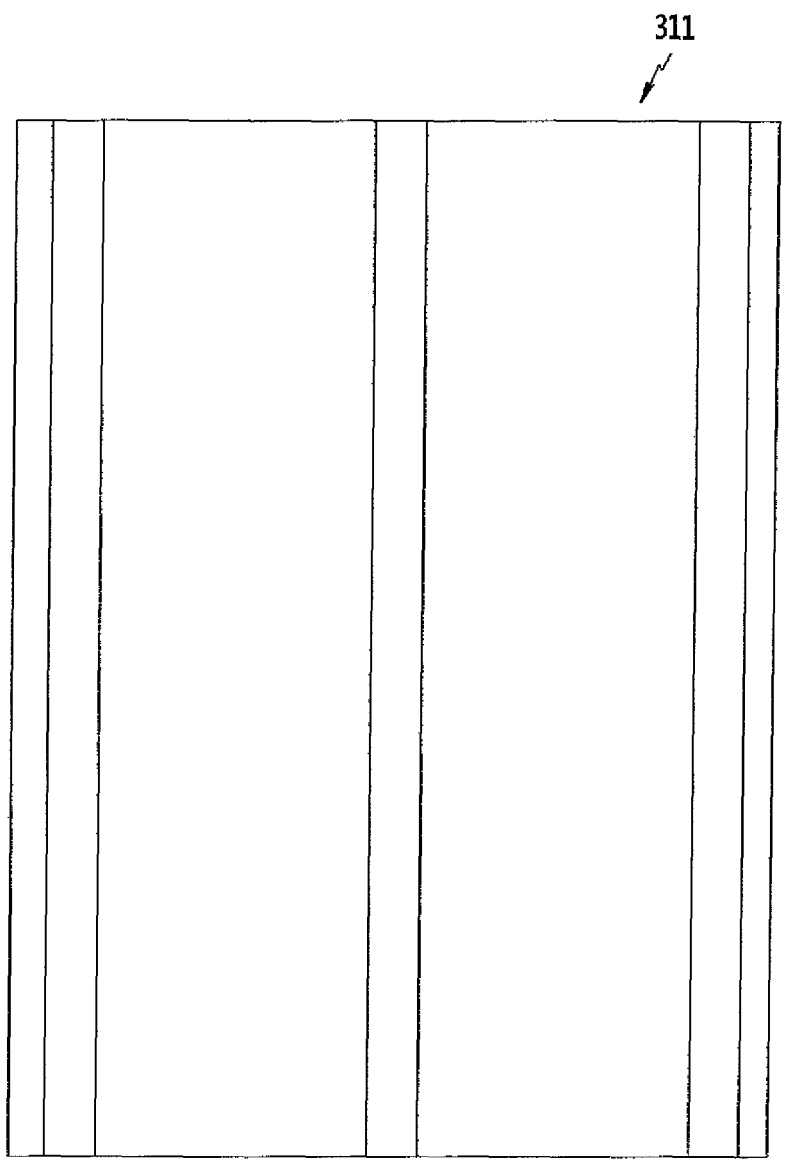
Figure 10B:
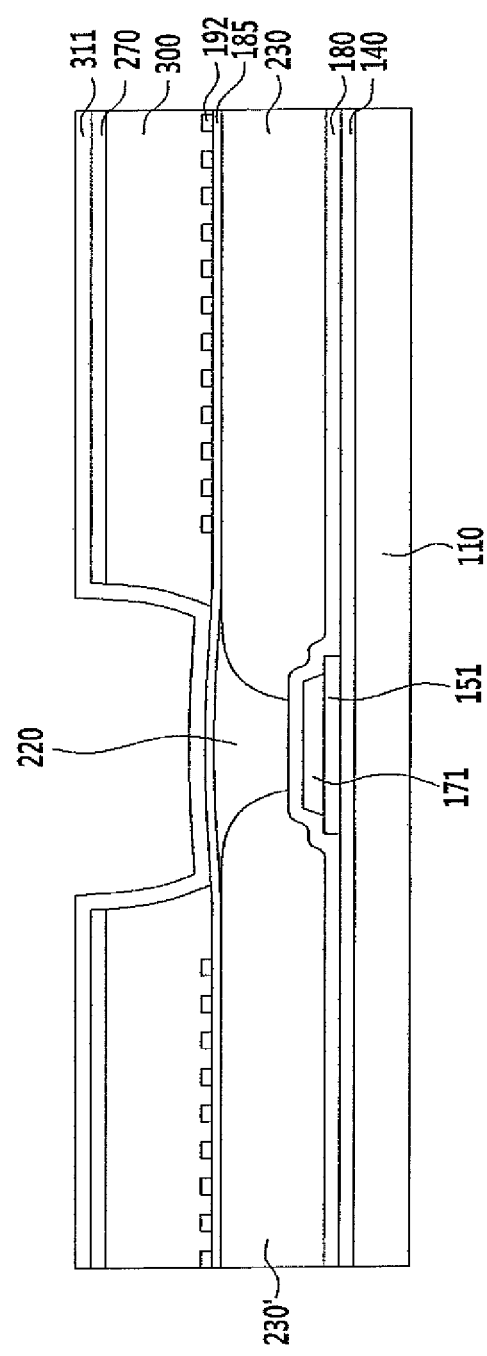
Figure 10C:
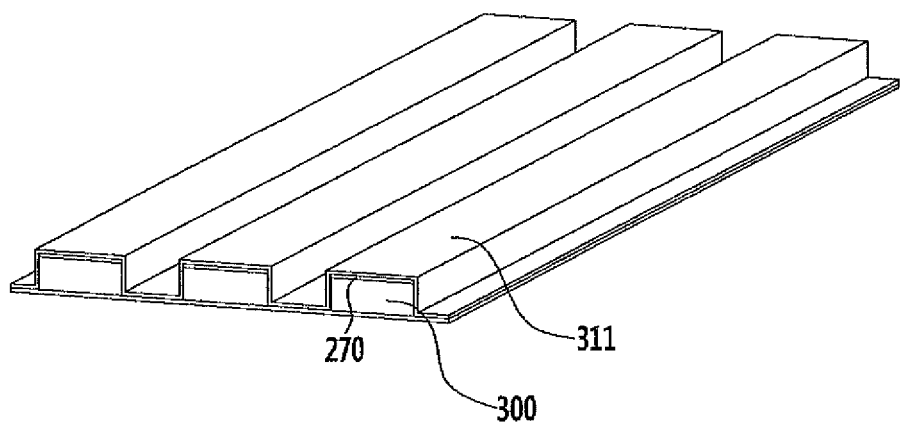

Next, as illustrated in FIGS. 10A to 10C, the lower insulating layer 311 containing, for example, an inorganic insulating material such as silicon nitride (SiNx) is formed on the entire surface of the liquid crystal panel with the linear patterns of the sacrificial layer 300 and the common electrode 270. The lower insulating layer 311 covers, for example, the linear patterns of the sacrificial layer 300 and the common electrode 270.

Figure 11A:
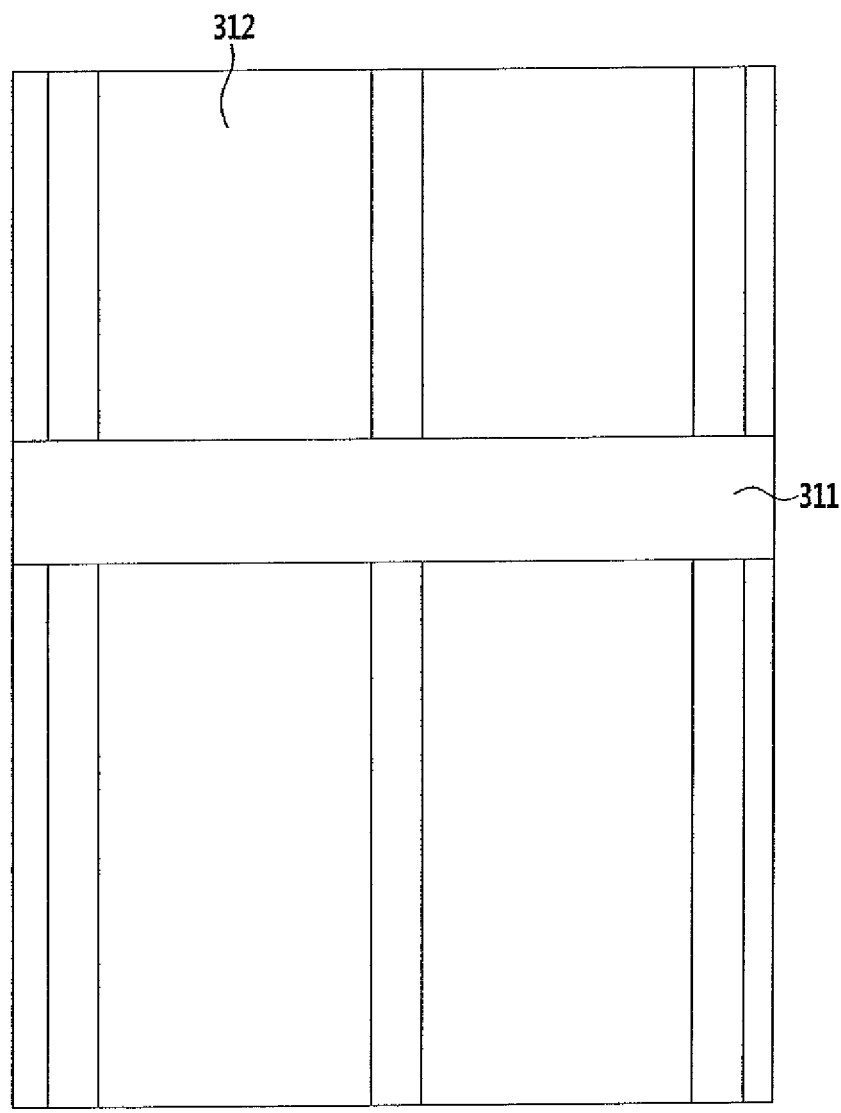
Figure 11B:
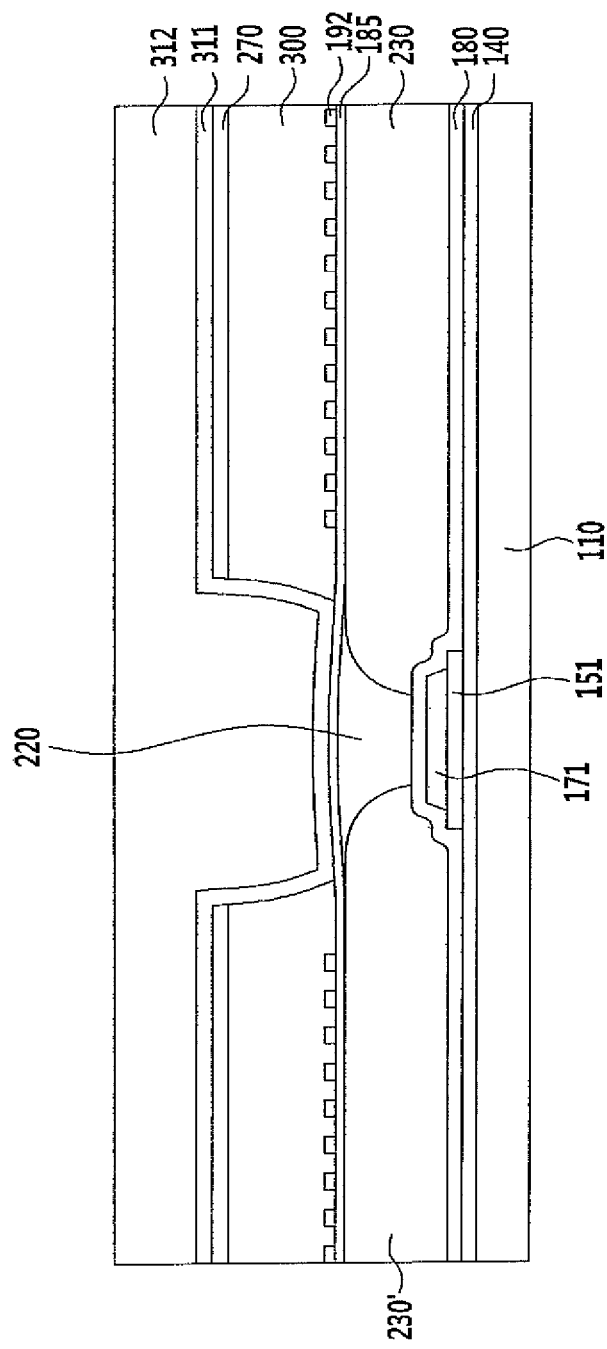
Figure 11C:
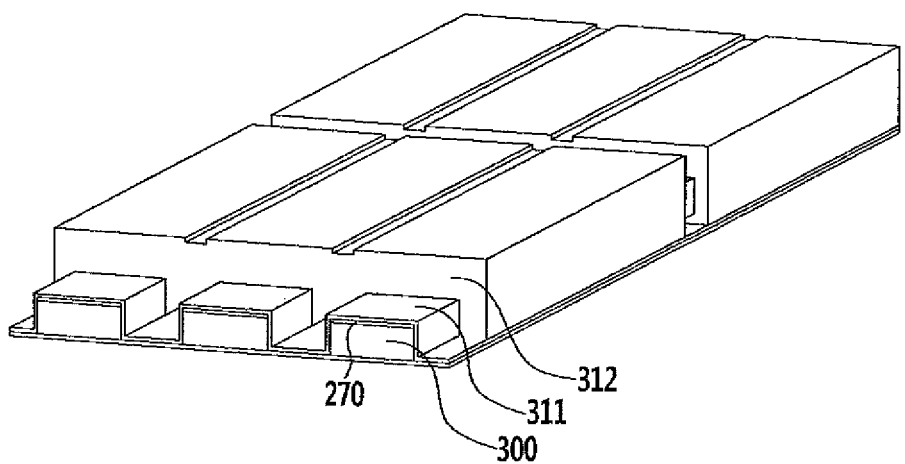

Next, as illustrated in FIGS. 11A to 11C, the roof layer 312 is formed. The roof layer 312 may contain, for example, an organic material, and the roof layer 312 is not formed in a region (hereinafter, referred to as a 'liquid crystal injection hole open region') etched during a process of forming the liquid crystal injection hole 335. In FIG. 11A, the liquid crystal injection hole open region is formed to correspond to a thin film transistor formation region and has a structure extending in a formation direction of the gate line. Further, as the roof layer 312 is not formed in the region corresponding to the liquid crystal injection hole open region, FIGS. 10A to 10C indirectly illustrate that the lower insulating layer 311 which is formed on the entire surface of the liquid crystal panel is exposed by the roof layer 312 as explained below.

The roof layer 312 is formed by, for example, laminating a material for forming the roof layer containing an organic material on the entire region of the panel, exposing and developing the laminated material by using as a mask, and then removing the material for forming the roof layer in the region corresponding to the liquid crystal injection hole open region. In this case, the lower insulating layer 311 formed below the roof layer 312 is not etched but exposed. For example, in the liquid crystal injection hole open region, the sacrificial layer 300, the common electrode 270, and the lower insulating layer 311 are just formed, and in other regions, the sacrificial layer 300 or the opening 301, the common electrode 270, the lower insulating layer 311, and the roof layer 312 are laminated.

Figure 12A:
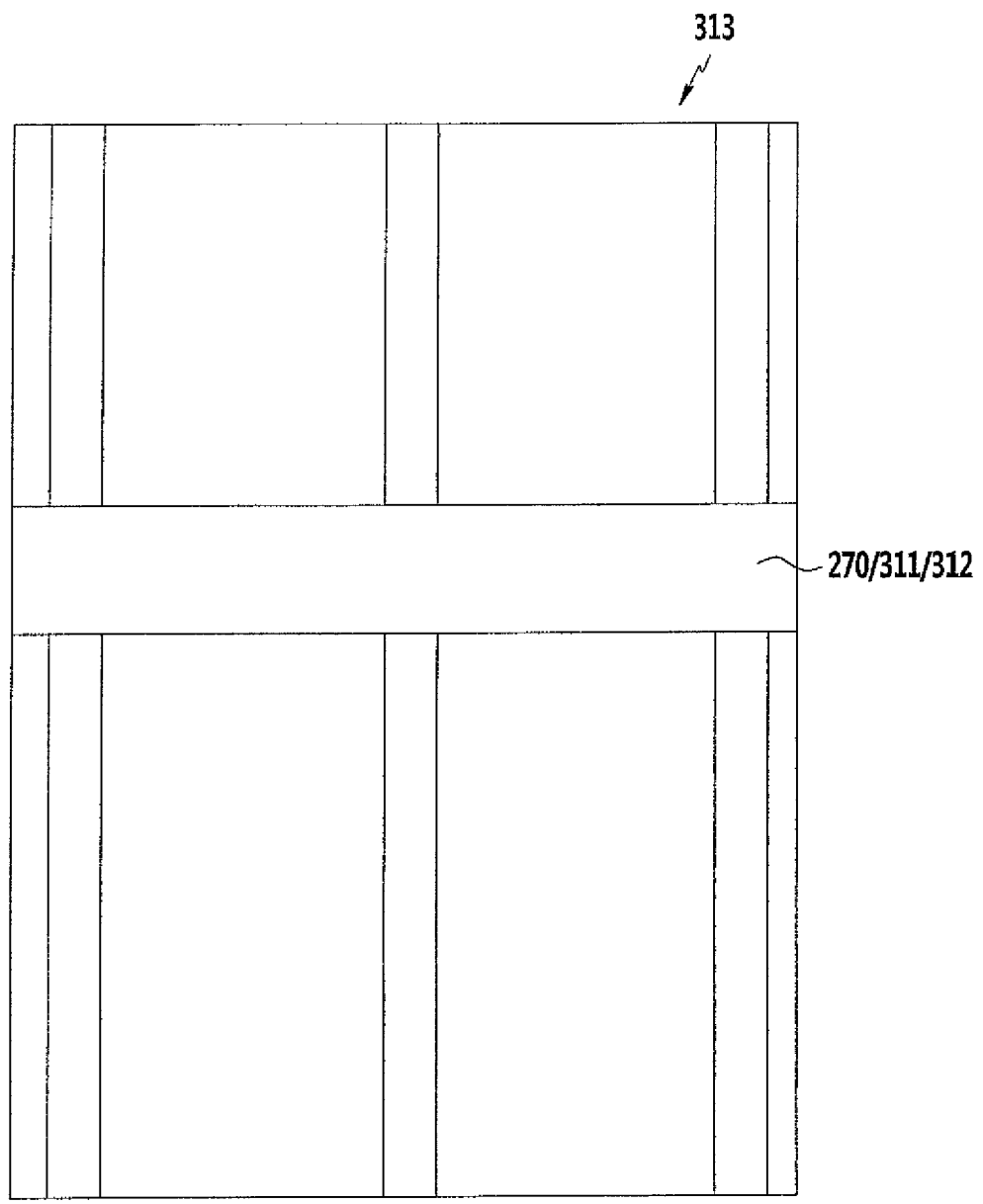
Figure 12B:
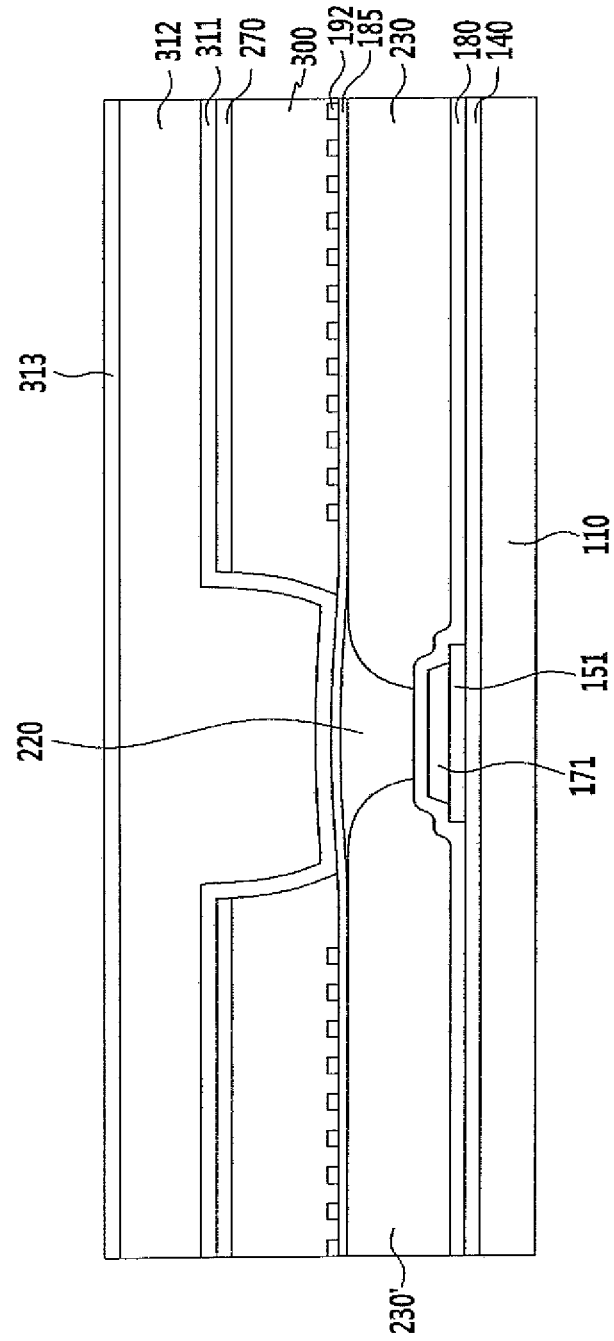
Figure 12C:
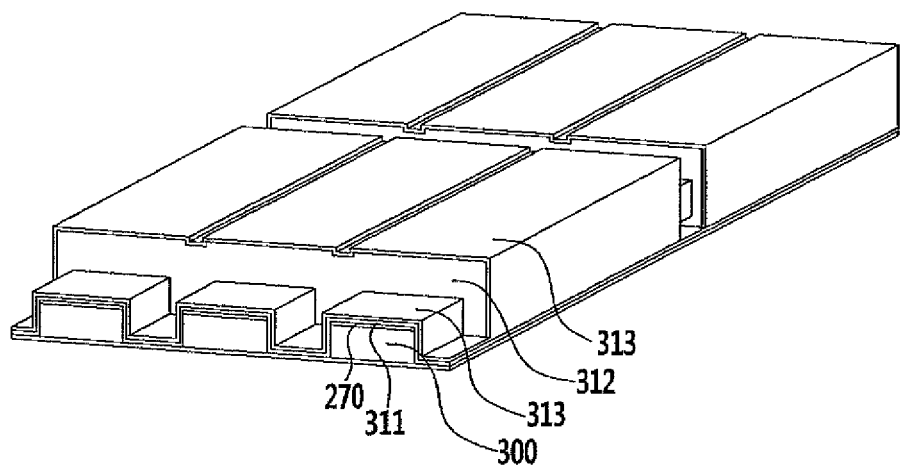

Next, as illustrated in FIGS. 12A to 12C, a material for forming an upper insulating layer containing, for example, an inorganic insulating material such as silicon nitride (SiNx) is laminated to form the upper insulating layer 313 on the entire surface of the liquid crystal panel.

Next, as illustrated in FIGS. 13A and 13D, the liquid crystal injection hole 335 is formed, for example, by etching the liquid crystal injection hole open region.

For example, as illustrated in FIG. 13B, the common electrode 270 remains by etching the lower insulating layer 311 and the upper insulating layer 313 formed in the liquid crystal injection hole open region of the upper insulating layer 313 and the lower insulating layer 311 laminated all over the entire region of the display panel made of an inorganic insulating material such as silicon nitride (SiNx).

Next, as illustrated in FIG. 13C, the common electrode 270 formed in the liquid crystal injection hole open region is, for example, etched to expose the sacrificial layer 300. In this case, according to an exemplary embodiment, a part of the common electrode 270 remains to electrically connect the adjacent common electrodes 270 to each other.

That is, to etch the liquid crystal injection hole open region, the photo resist PR is formed in the entire region, the photo resist PR corresponding to the liquid crystal injection hole open region is removed to form the photo resist pattern, and thereafter, etched according to the photo resist pattern to etch the liquid crystal injection hole open region. In this case, in the etched layer in the liquid crystal injection hole open region, the material 313 for the upper insulating layer, the lower insulating layer 311, the common electrode 270, and the sacrificial layer 300 are, for example, etched and the layer therebelow is, for example, not etched. According to an exemplary embodiment, only a part of the sacrificial layer 300 may be etched or never be etched. Here, the process of etching the liquid crystal injection hole open region may be performed by, for example, dry etching, and in the case of an etchant that may etch the etching layer together, the process may be performed by, for example, wet etching.

Next, as illustrated in FIG. 13D, the exposed sacrificial layer 300 is, for example, removed. In the present exemplary embodiment, as the sacrificial layer 300 is made of the photo resist PR, a process of removing the photo resist pattern formed on the upper insulating layer 313 may be, for example, performed together. That is, the photo resist pattern formed on the upper insulating layer 313 may be, for example, wet-etched together with the sacrificial layer 300 by immersing them in an etchant (for example, a photo resist stripper) for removing the photo resist pattern. According to the above process, the process of removing the photo resist PR formed on the upper insulating layer 313 and the process of removing the sacrificial layer 300 may be performed, for example, at the same time, and as a result, there is a benefit in that a manufacturing process is shortened. However, in the case of forming the sacrificial layer 300 with a material, not the photo resist PR, two separate processes may be performed. Further, the sacrificial layer 300 may be formed by, for example, dry etching, and not wet etching.

Thereafter, as illustrated in FIGS. 2 and 3, an alignment layer (not illustrated) or the liquid crystal layer 3 are, for example, injected in the microcavity 305 by using capillary force.

Next, although not illustrated, a capping layer (not illustrated) is formed to prevent the liquid crystal layer 3 injected in the microcavity 305 from being leaked outside and then a process of sealing the microcavity 305 may be performed.

Alternatively, for example, in an exemplary embodiment, the lower insulating layer 311 and the upper insulating layer 313 may be omitted.

Further, a process of attaching a polarizer (not illustrated) below the insulation substrate 110 and on the upper insulating layer 313 may be further included. The polarizer may include, for example, a polarized element generating polarization and a tri-acetyl-cellulose (TAC) layer for ensuring durability, and according to an exemplary embodiment, directions in transmissive axes of an upper polarizer and a lower polarizer may be, for example, vertical or parallel to each other.

According to the manufacturing method according to the present exemplary embodiment of the present invention, the sacrificial layer 300 is, for example, etched at the upper portion to have a sharp side wall and thus the side wall of the microcavity 305 is sharp. The liquid crystal layer 3 injected in the microcavity 305 does not have a sufficient cell gap at the side wall and thus a light leakage phenomenon occurs. In the present exemplary embodiment of the present invention, as the side wall is sharp, the horizontal area is narrow and thus a wide opening area may be ensured.

The viewpoint will be described with reference to FIGS. 14 and 15 by comparing a nano crystal display device according to an Example of the present invention and a nano crystal display device according to Comparative Example.

Figure 14:
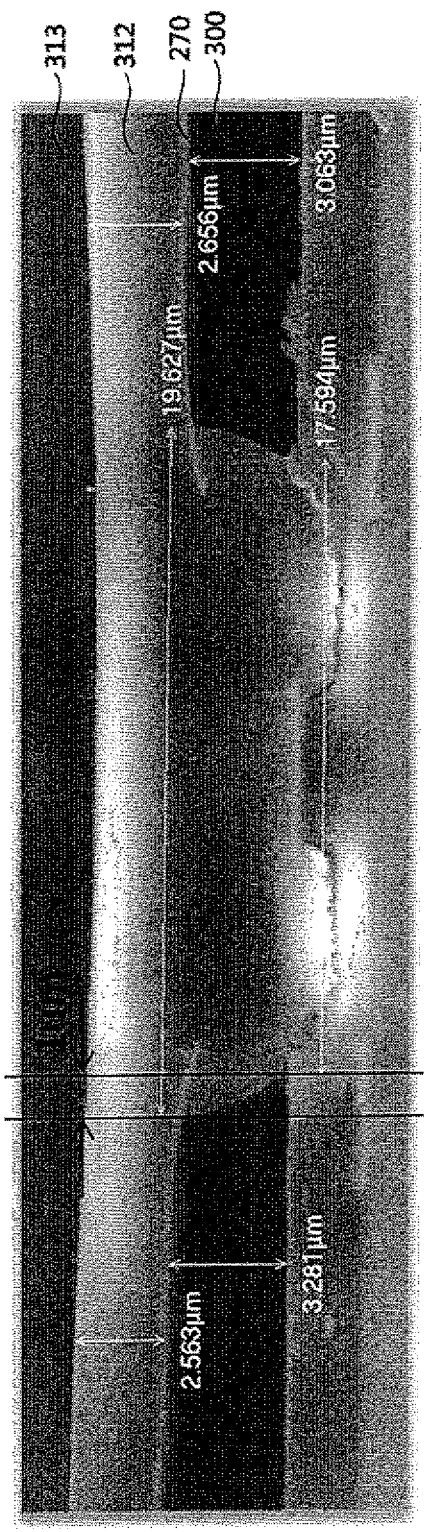
FIGS. 14 and 15 are photographs comparing cross sections of liquid crystal displays according to an Example of the present invention and a Comparative Example.
Figure 15:
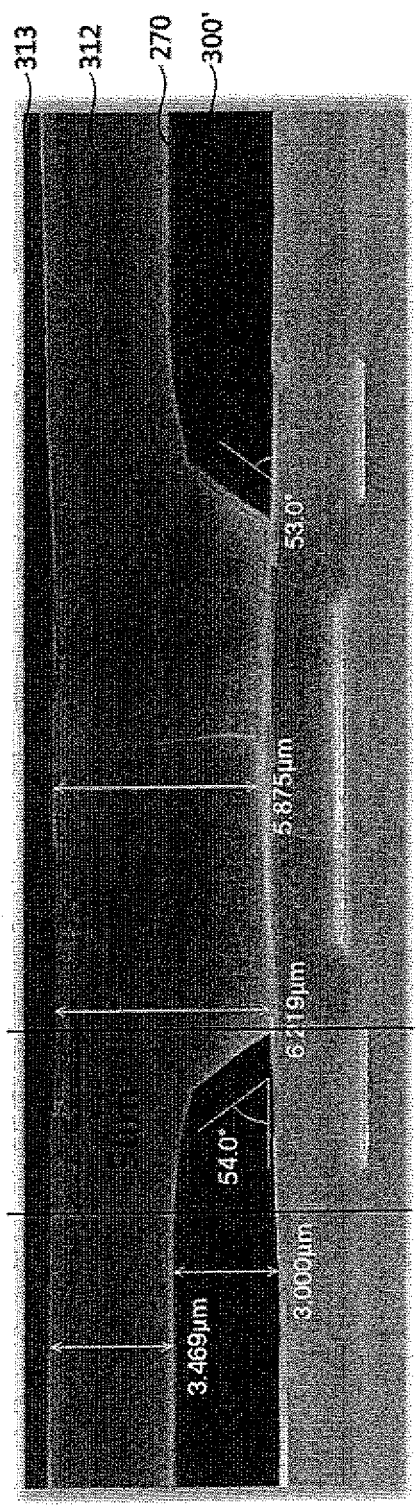

FIGS. 14 and 15 are photographs comparing cross sections of liquid crystal displays according to an Example of the present invention and a Comparative Example. FIG. 14 is a cross-sectional view of the above-mentioned Example of the present invention, and FIG. 15 is a cross-sectional view of the above-mentioned Comparative Example.

As illustrated in FIG. 14, in the structure according to an Example of the present invention, as the side wall of the sacrificial layer 300 was sharp, the horizontal width was only about 1 µm. As a result, the sacrificial layer 300 portion may be ensured as the opening because a width of the portion covered by the black matrix 220 is covered only by about 1 µm.

In the Comparative Example, the sacrificial layer 300 was laminated with the photo resist PR and the photo resist PR was exposed and developed to form the pattern of the sacrificial layer 300. In this case, the side wall of the sacrificial layer 300 has no choice but to have a tapered structure, and in the case of the tapered structure, the region corresponding to the side wall of the sacrificial layer 300 has a horizontal width of about 5 µm as illustrated in FIG. 15. Thus, as a result, a greater area of the sidewall of the sacrificial layer 300 is covered by the black matrix 220 in the Comparative Example of FIG. 15 than is covered by the black matrix 220 in the present Example of FIG. 14. Therefore, according to the above-mentioned Example of the present invention, a wider opening may be included than in the Comparative Example.

Hereinafter, an exemplary embodiment of the present invention will be described with reference to FIGS. 16 to 18.

Figure 16:
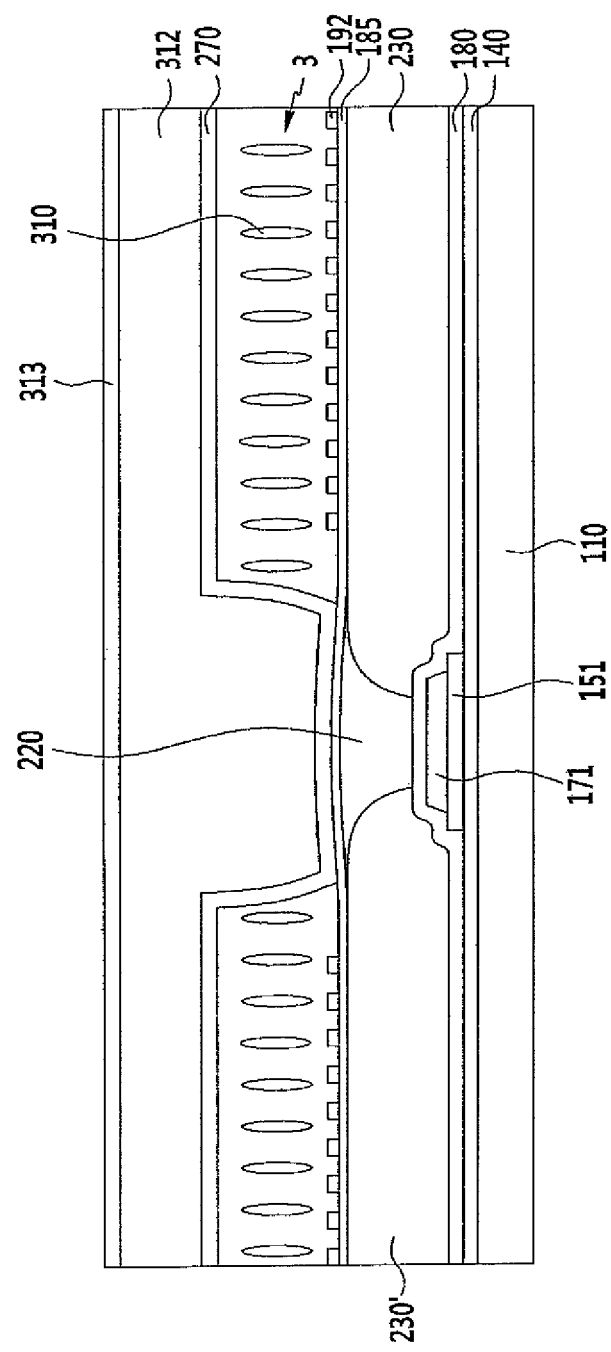
FIG. 16 illustrates a liquid crystal display according to an exemplary embodiment of the present invention.
Figure 17:
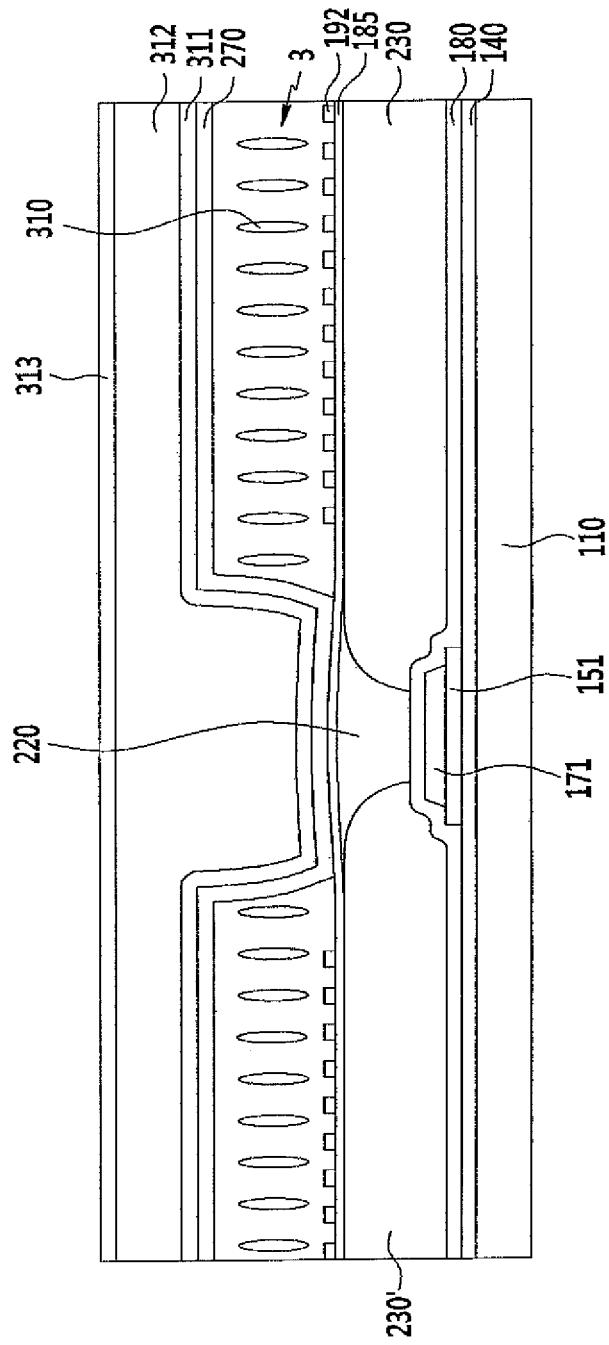
FIG. 17 illustrates a liquid crystal display according to an exemplary embodiment of the present invention.
Figure 18:
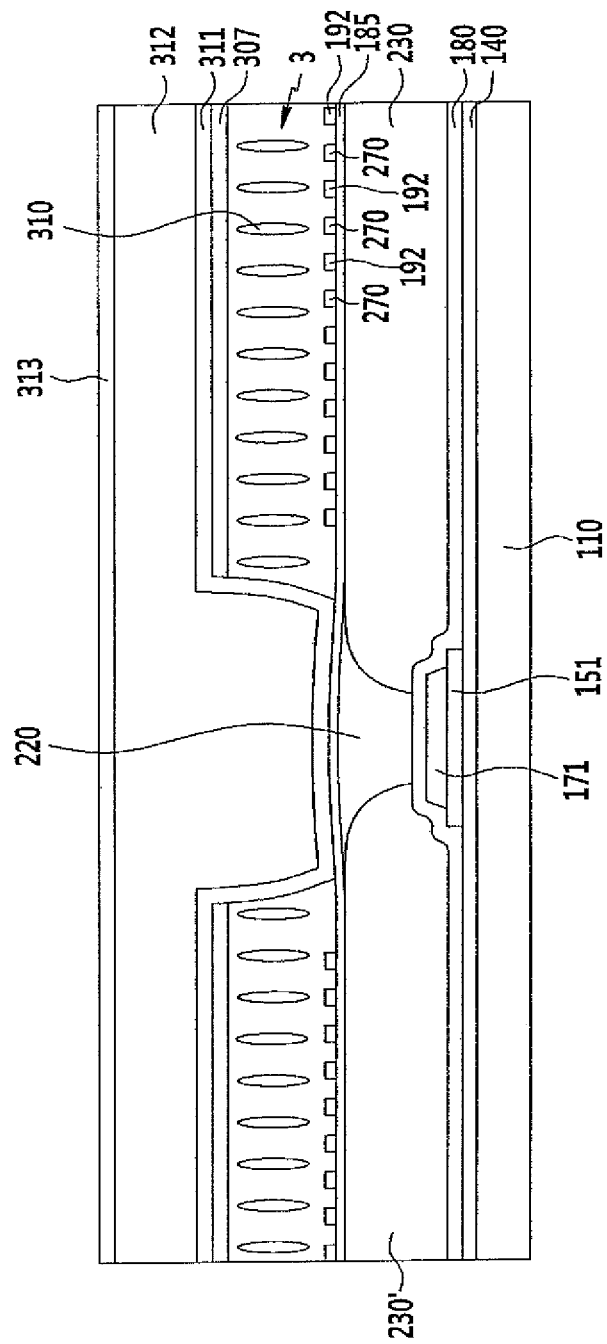
FIG. 18 illustrates a liquid crystal display according to an exemplary embodiment of the present invention.

FIGS. 16 to 18 illustrate a liquid crystal display according to an exemplary embodiment of the present invention.

First, the present exemplary embodiment of FIG. 16 will be described.

FIG. 16 is a diagram corresponding to FIG. 2.

In the present exemplary embodiment of FIG. 16, the lower insulating layer 311 is omitted unlike the liquid crystal display of FIG. 2. In addition, in the present exemplary embodiment, the common electrode 270 is formed, for example, at the sacrificial layer 300, the microcavity 305, or the side wall of the liquid crystal layer 3 unlike the liquid crystal display of FIG. 2.

In the present exemplary embodiment of FIG. 16, unlike the liquid crystal display of FIG. 2, after the etch stop layer used when the sacrificial layer 300 is etched is removed, the common electrode 270 is, for example, formed on the side wall. That is, the common electrode 270 is positioned, for example, at the flat portion of the microcavity 305 or the liquid crystal layer 3 and on the side wall of the microcavity 305 or the liquid crystal layer 3.

As such, in the present exemplary embodiment, when the sacrificial layer 300 made of the photo resist is etched by ashing, a separate layer (which may be various according to an exemplary embodiment and may use a transparent conductive material such as, for example, ITO and IZO or an insulating material such as, for example, SiNx and SiOx) is formed as the etch stop layer preventing etching and the sacrificial layer 300 is completed. Then, the etch stop layer is removed and the common electrode 270 is formed thereon.

Meanwhile, according to an exemplary embodiment, when the transparent conductive material such as, for example, ITO and IZO is used as the etch stop layer, the etch stop layer is not removed and the same transparent conductive material is laminated on the entire surface thereof to form the common electrode 270.

Meanwhile, in the present exemplary embodiment of FIG. 17, unlike the liquid crystal display of FIG. 16, the lower insulating layer 311 is formed, for example, all over the upper portion of the common electrode 270. Thus, the only difference between the liquid crystal display of FIG. 16 and the liquid crystal display of FIG. 17 is that the lower insulating layer 311 is additionally formed in FIG. 17.

In FIG. 18, the common electrode 270 is not formed above the liquid crystal layer 3, but rather the common electrode 270 and the pixel electrode 192 are, for example, alternately formed on the same layer as each other. Further, instead of the transparent conductive material used as the etch stop layer in FIG. 2, the insulating material such as, for example, SiNx and SiOx is used as an etch stop layer 307.

In FIG. 18, the common electrode 270 is, for example, positioned between the pixel electrodes 192 and further, the etch stop layer 307 is positioned at the position of the common electrode 270. The etch stop layer 307 made of, for example, the insulating material such as, for example, SiNx and SiOx may be formed using, for example, oxygen (O2) as the ashing gas.

Figure 19:
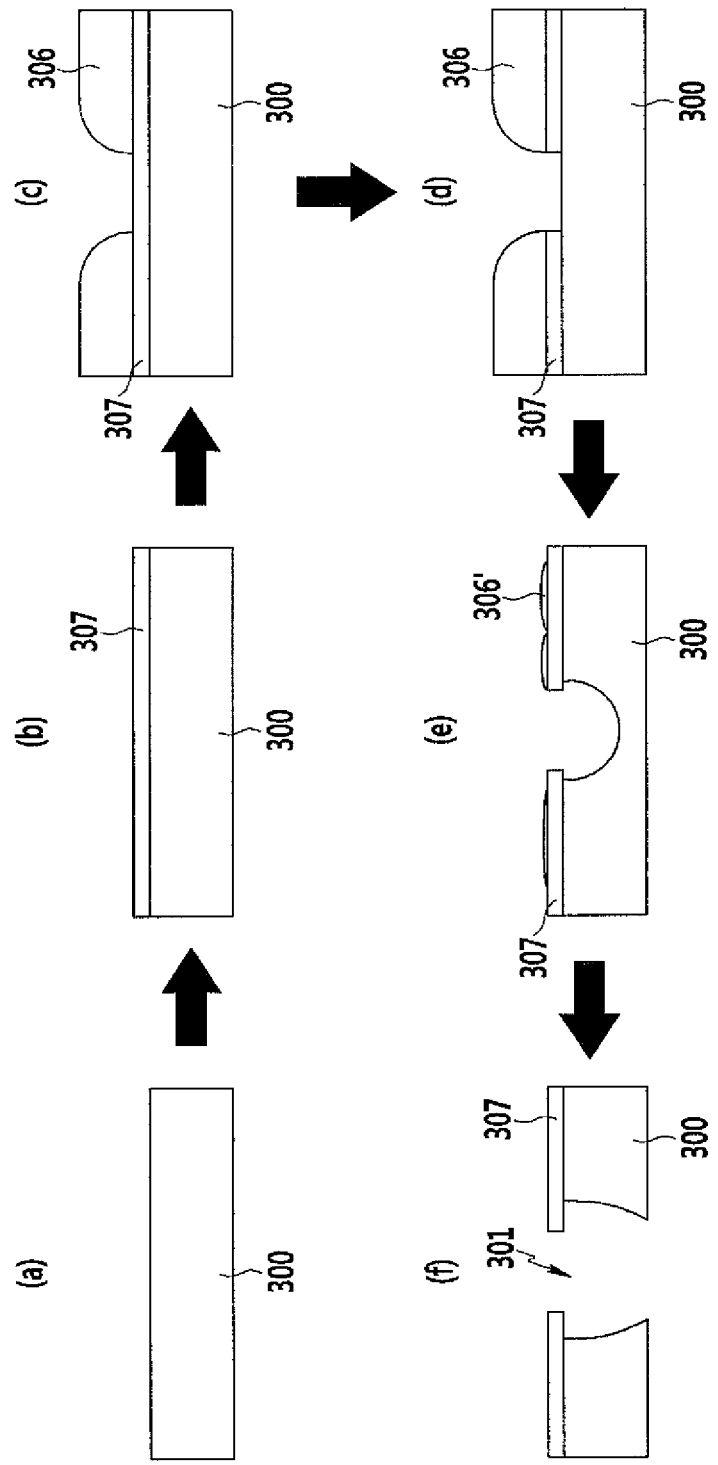
FIGS. 19(*a*)-(*f*) illustrate a method of manufacturing a sacrificial layer and etch stop layer used in forming the liquid crystal display of FIG. 18 in accordance with an exemplary embodiment of the present invention.

In FIGS. 19 (a)-(d), a method for manufacturing the liquid crystal display of FIG. 18 is simply illustrated, and methods of forming the pixel electrode 192 and the common electrode 270 together may be various, and only the upper portion of the sacrificial layer 300 will be described. In particular, FIGS. 19(a)-(f) illustrate a method of manufacturing a sacrificial layer and etch stop layer used in forming the liquid crystal display of FIG. 18 in accordance with an exemplary embodiment of the present invention.

First, as shown in FIG. 19(a), the photo resist PR is, for example, laminated on the entire surface of the liquid crystal panel to form the sacrificial layer 300. Thereafter, as shown in FIG. 19(b), an insulating material 307 such as, for example, SiNx and SiOx is laminated on the entire surface.

Next, as shown in FIG. 19 (c), the photo resist PR is, for example, laminated and then exposed and developed to form a photo resist pattern 306.

Next, as shown in FIG. 19(d), the etch stop layer 307 made of, for example, the insulating material 307 such as SiNx and SiOx is completed by using, for example, the photo resist pattern 306 as a mask.

Next, as shown in FIGS. 19(e)-(f), the exposed sacrificial layer 300 and the photo resist pattern 306 are removed by ashing using the completed etched stop layer 307 as a mask. After ashing, the opening 301, the region where the exposed sacrificial layer is removed, is formed between the sacrificial layers 300. FIG. 19(e) is a cross-sectional view during the ashing process. Thus, the photo resist patterns not totally removed is also illustrates as 306' in FIG. 19(e). In this case, for example, oxygen (O2) may be used as ashing gas. The etch stop layer 307 made of, for example, the insulating material such as SiNx and SiOx is not etched by the ashing gas, and the sacrificial layer 300 made of the photo resist PR and the photo resist pattern 306 are just removed. As a result, the structure of the sacrificial layer 300 and the etch stop layer 307 is completed. Even in the present exemplary embodiment, when the photo resist is removed by ashing, as anisotropic etching is performed in dry etching equipment, the side wall of the sacrificial layer 300 may be substantially vertically formed. As a result, the side wall of the sacrificial layer 300 does not largely occupy the horizontal area.

According to the manufacturing method of the present exemplary embodiment of the present invention, as the sacrificial layer 300 is etched at the upper portion to have a sharp side wall, the microcavity 305 has a sharp side wall. The liquid crystal layer 3 injected in the microcavity 305 does not have a sufficient cell gap at the side wall and thus a light leakage phenomenon occurs. In the present exemplary embodiment of the present invention, as the side wall of the microcavity 305 is sharp, the horizontal area occupied by the side wall of the microcavity 305 is narrow and thus a wide opening area may be ensured.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A manufacturing method of a liquid crystal display, comprising:
    forming a sacrificial layer on a liquid crystal panel;
    forming an etch stop layer on the sacrificial layer;
    forming a photo resist pattern on the etch stop layer;
    completing the etch stop layer using the photo resist pattern as a mask;
    ashing the photo resist pattern and the sacrificial layer by using the completed etch stop layer as a mask;
    forming a microcavity by removing a portion of the sacrificial layer; and
    forming a liquid crystal layer in the microcavity.

2. The method of claim 1, wherein in the forming of the sacrificial layer, the sacrificial layer is formed by laminating a photo resist on the liquid crystal panel.

3. The method of claim 2, wherein the etch stop layer includes one of indium tin oxide (ITO) or indium zinc oxide (IZO).

4. The method of claim 3, wherein an ashing gas is used in the ashing and wherein the ashing gas includes one of oxygen or oxygen and sulfur hexafluoride ($SF_6$).

5. The method of claim 4, wherein the etch stop layer serves as a common electrode receiving common voltage.

6. The method of claim 4, further comprising: removing a portion of the etch stop layer before removing the portion of the sacrificial layer after ashing, and forming a common electrode, a lower insulating layer, or a roof layer at the removed etch stop layer portion.

7. The method of claim 2, wherein the etch stop layer includes one of silicon nitride (SiNx) or silicon oxide (SiOx).

8. The method of claim 7, wherein an ashing gas is used in the ashing, and wherein the ashing gas includes oxygen.

9. The method of claim 8, further comprising: forming a common electrode and a pixel electrode on the liquid crystal panel before forming the sacrificial layer.

* * * * *